(12) United States Patent  
Davidson et al.

(10) Patent No.: US 9,324,198 B2  
(45) Date of Patent: *Apr. 26, 2016

(54) SYSTEMS AND METHODS FOR UTILIZING TELEMATICS DATA TO IMPROVE FLEET MANAGEMENT OPERATIONS

(71) Applicant: UNITED PARCEL SERVICE OF AMERICA, INC., Atlanta, GA (US)

(72) Inventors: Mark J. Davidson, Alpharetta, GA (US); John A. Olsen, III, Cumming, GA (US)

(73) Assignee: United Parcel Service of America, Inc., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/633,802

(22) Filed: Feb. 27, 2015

(65) Prior Publication Data

US 2015/0170440 A1   Jun. 18, 2015

Related U.S. Application Data

(63) Continuation of application No. 14/517,500, filed on Oct. 17, 2014, which is a continuation of application No. 13/799,627, filed on Mar. 13, 2013, now Pat. No. 8,896,430, which is a continuation of application No.

(Continued)

(51) Int. Cl.
*B60R 25/10* (2013.01)
*G07C 5/02* (2006.01)

(Continued)

(52) U.S. Cl.
CPC . *G07C 5/02* (2013.01); *B60R 25/34* (2013.01); *G06F 17/00* (2013.01); *G06Q 10/08* (2013.01); *G07C 5/008* (2013.01)

(58) Field of Classification Search
CPC ........ G06F 17/00; G06Q 10/08; G07C 5/008; G07C 5/02; B60R 25/34

USPC ........................ 340/426.1, 438, 439; 701/123  
See application file for complete search history.

(56) References Cited

U.S. PATENT DOCUMENTS 3,526,127 A   9/1970   Sarkis  
3,789,198 A   1/1974   Henson et al.

(Continued)

FOREIGN PATENT DOCUMENTS

DE      196 18 535 A1      7/1997  
DE     102004061331        6/2006

(Continued)

OTHER PUBLICATIONS

"ArcGIS9—ArcMap Tutorial", ESRI, 2008, 58 pages, USA.

(Continued)

*Primary Examiner* — Thomas Mullen  
(74) *Attorney, Agent, or Firm* — Alston & Bird LLP

(57) ABSTRACT

According to various embodiments, a fleet management system is provided for capturing, storing, and analyzing telematics data to improve fleet management operations. The fleet management system may be used, for example, by a shipping entity (e.g., a common carrier) to capture telematics data from a plurality of vehicle sensors located on various delivery vehicles and to analyze the captured telematics data. In particular, various embodiments of the fleet management system are configured to analyze engine idle data in relation to other telematics data in order to identify inefficiencies, safety hazards, and theft hazards in a driver's delivery process. The fleet management system may also be configured to assess various aspects of vehicle performance, such as vehicle travel delays and vehicle speeds. These analytical capabilities allow the fleet management system to assist fleet managing entities, or other entities, in analyzing driver performance, reducing fuel and maintenance costs, and improving route planning.

24 Claims, 10 Drawing Sheets

Related U.S. Application Data

12/556,140, filed on Sep. 9, 2009, now Pat. No. 8,416,067.

(60) Provisional application No. 61/095,486, filed on Sep. 9, 2008.

(51) Int. Cl.
  *G06Q 10/08* (2012.01)
  *G06F 17/00* (2006.01)
  *B60R 25/34* (2013.01)
  *G07C 5/00* (2006.01)

(56) References Cited

U.S. PATENT DOCUMENTS

| | | |
|---|---|---|
| 3,822,049 A | 7/1974 | Saunders |
| 4,113,217 A | 9/1978 | O'Connell |
| 4,124,815 A | 11/1978 | Stoschek |
| 4,152,693 A | 5/1979 | Ashworth, Jr. |
| 4,312,310 A | 1/1982 | Chivilo et al. |
| 4,398,515 A | 8/1983 | Canup et al. |
| 4,492,195 A | 1/1985 | Takahashi et al. |
| 4,514,811 A | 4/1985 | Daubenmier et al. |
| 4,773,011 A | 9/1988 | VanHoose |
| 4,945,759 A | 8/1990 | Krofchalk et al. |
| 4,977,399 A | 12/1990 | Price et al. |
| 5,014,206 A | 5/1991 | Scribner et al. |
| 5,041,976 A | 8/1991 | Marko et al. |
| 5,048,482 A | 9/1991 | Kraft et al. |
| 5,060,156 A | 10/1991 | Vajgart et al. |
| 5,068,656 A | 11/1991 | Sutherland |
| 5,095,500 A | 3/1992 | Tayloe et al. |
| 5,111,902 A | 5/1992 | Sundeen et al. |
| 5,117,682 A | 6/1992 | Amano |
| 5,218,367 A | 6/1993 | Sheffer et al. |
| 5,227,614 A | 7/1993 | Danielson et al. |
| 5,347,274 A | 9/1994 | Hassett et al. |
| 5,398,276 A | 3/1995 | Lemke et al. |
| 5,414,809 A | 5/1995 | Hogan et al. |
| 5,444,444 A | 8/1995 | Ross |
| 5,472,097 A | 12/1995 | Villachica |
| 5,481,588 A | 1/1996 | Rickli et al. |
| 5,497,149 A | 3/1996 | Fast |
| 5,500,516 A | 3/1996 | Durbin |
| 5,515,419 A | 5/1996 | Sheffer |
| 5,528,758 A | 6/1996 | Yeh |
| 5,534,684 A | 7/1996 | Danielson |
| 5,561,839 A | 10/1996 | Österberg et al. |
| 5,635,693 A | 6/1997 | Benson et al. |
| 5,648,770 A | 7/1997 | Ross |
| 5,708,423 A | 1/1998 | Ghaffari et al. |
| 5,736,725 A | 4/1998 | Danielson |
| 5,739,787 A | 4/1998 | Burke et al. |
| 5,751,245 A | 5/1998 | Janky et al. |
| 5,751,973 A | 5/1998 | Hassett et al. |
| 5,752,164 A | 5/1998 | Jones |
| 5,758,313 A | 5/1998 | Shah et al. |
| 5,771,169 A | 6/1998 | Wendte |
| 5,797,134 A | 8/1998 | McMillan et al. |
| 5,802,545 A | 9/1998 | Coverdill |
| 5,805,419 A | 9/1998 | Hundt et al. |
| 5,808,564 A | 9/1998 | Simms et al. |
| 5,808,565 A | 9/1998 | Matta et al. |
| 5,808,907 A | 9/1998 | Shetty et al. |
| 5,815,093 A | 9/1998 | Kikinis |
| 5,818,356 A | 10/1998 | Schuessler |
| 5,825,283 A | 10/1998 | Camhi |
| 5,834,749 A | 11/1998 | Durbin |
| 5,835,377 A | 11/1998 | Bush |
| 5,857,159 A | 1/1999 | Dickrell et al. |
| 5,862,500 A | 1/1999 | Goodwin |
| 5,867,382 A | 2/1999 | McLaughlin |
| 5,867,785 A | 2/1999 | Averbuch et al. |
| 5,904,727 A | 5/1999 | Prabhakaran |
| 5,919,239 A | 7/1999 | Fraker et al. |
| 5,926,762 A | 7/1999 | Arpee et al. |
| 5,928,291 A | 7/1999 | Jenkins et al. |
| 5,938,716 A | 8/1999 | Shuty et al. |
| 5,946,612 A | 8/1999 | Johannson |
| 5,948,026 A | 9/1999 | Beemer, II. et al. |
| 5,974,357 A | 10/1999 | Poonsaengsathit et al. |
| 5,982,325 A | 11/1999 | Thornton et al. |
| 5,987,306 A | 11/1999 | Nilsen et al. |
| 5,991,622 A | 11/1999 | Henry, Jr. |
| 5,993,098 A | 11/1999 | Osada |
| 6,003,010 A | 12/1999 | Scolly et al. |
| 6,003,773 A | 12/1999 | Durbin et al. |
| 6,031,455 A | 2/2000 | Grube et al. |
| 6,034,379 A | 3/2000 | Bunte et al. |
| 6,060,992 A | 5/2000 | Huang et al. |
| 6,064,970 A | 5/2000 | McMillan et al. |
| 6,071,643 A | 6/2000 | Chino et al. |
| 6,075,530 A | 6/2000 | Lucas et al. |
| 6,084,528 A | 7/2000 | Beach et al. |
| 6,084,870 A | 7/2000 | Wooten et al. |
| 6,088,648 A | 7/2000 | Shah et al. |
| 6,092,021 A | 7/2000 | Ehlbeck et al. |
| 6,098,048 A | 8/2000 | Dashefsky et al. |
| 6,112,152 A | 8/2000 | Tuttle |
| 6,124,806 A | 9/2000 | Cunningham et al. |
| 6,124,810 A | 9/2000 | Segal et al. |
| 6,128,543 A | 10/2000 | Hitchner |
| 6,134,437 A | 10/2000 | Karabinis et al. |
| 6,148,262 A | 11/2000 | Fry |
| 6,157,838 A | 12/2000 | Di Huo et al. |
| 6,169,896 B1 | 1/2001 | Sant et al. |
| 6,181,994 B1 | 1/2001 | Colson et al. |
| 6,202,629 B1 | 3/2001 | Zhu et al. |
| 6,211,781 B1 | 4/2001 | McDonald |
| 6,246,672 B1 | 6/2001 | Lumelsky |
| 6,246,938 B1 | 6/2001 | Giletta et al. |
| 6,249,008 B1 | 6/2001 | Bunte et al. |
| 6,253,129 B1 | 6/2001 | Jenkins et al. |
| 6,272,337 B1 | 8/2001 | Mount et al. |
| 6,278,361 B1 | 8/2001 | Magiawala et al. |
| 6,282,486 B1 | 8/2001 | Bates et al. |
| 6,285,916 B1 | 9/2001 | Kadaba et al. |
| 6,292,724 B1 | 9/2001 | Apsell et al. |
| 6,295,492 B1 | 9/2001 | Lang et al. |
| 6,304,816 B1 | 10/2001 | Berstis |
| 6,306,063 B1 | 10/2001 | Horgan et al. |
| 6,308,120 B1 | 10/2001 | Good |
| 6,313,791 B1 | 11/2001 | Klanke |
| 6,315,255 B1 | 11/2001 | Chan et al. |
| 6,324,659 B1 | 11/2001 | Pierro |
| 6,330,499 B1 | 12/2001 | Chou et al. |
| 6,336,035 B1 | 1/2002 | Somoza et al. |
| 6,338,152 B1 | 1/2002 | Fera et al. |
| 6,339,745 B1 | 1/2002 | Novik |
| 6,363,323 B1 | 3/2002 | Jones |
| 6,377,881 B1 | 4/2002 | Mullins |
| 6,389,337 B1 | 5/2002 | Kolls |
| 6,400,690 B1 | 6/2002 | Liu et al. |
| 6,401,027 B1 | 6/2002 | Xu et al. |
| 6,405,112 B1 | 6/2002 | Rayner |
| 6,408,232 B1 | 6/2002 | Cannon et al. |
| 6,408,233 B1 | 6/2002 | Solomon et al. |
| 6,411,891 B1 | 6/2002 | Jones |
| 6,433,732 B1 | 8/2002 | Dutta |
| 6,434,512 B1 | 8/2002 | Discenzo |
| 6,449,485 B1 | 9/2002 | Anzil |
| 6,459,967 B1 | 10/2002 | Otto |
| 6,459,969 B1 | 10/2002 | Bates et al. |
| 6,462,675 B1 | 10/2002 | Humphrey et al. |
| 6,470,240 B1 | 10/2002 | Haynes et al. |
| 6,477,452 B2 | 11/2002 | Good |
| 6,484,080 B2 | 11/2002 | Breed |
| 6,496,775 B2 | 12/2002 | McDonald, Jr. et al. |
| 6,496,806 B1 | 12/2002 | Horwitz et al. |
| 6,498,986 B1 | 12/2002 | Kurtzberg et al. |
| 6,502,030 B2 | 12/2002 | Hilleary |
| 6,509,749 B1 | 1/2003 | Buelna et al. |
| 6,525,672 B2 | 2/2003 | Chainer et al. |

(56) References Cited

U.S. PATENT DOCUMENTS

| | | |
|---|---|---|
| 6,526,341 B1 | 2/2003 | Bird et al. |
| 6,529,818 B2 | 3/2003 | Kitajima et al. |
| 6,535,142 B2 | 3/2003 | Wakabayashi et al. |
| 6,570,529 B2 | 5/2003 | Richton et al. |
| 6,580,973 B2 | 6/2003 | Leivian et al. |
| 6,587,787 B1 | 7/2003 | Yokota |
| 6,594,579 B1 | 7/2003 | Lowrey et al. |
| 6,600,418 B2 | 7/2003 | Francis et al. |
| 6,603,966 B1 | 8/2003 | Sheffield |
| 6,604,033 B1 | 8/2003 | Banet et al. |
| 6,611,740 B2 | 8/2003 | Lowery et al. |
| 6,611,755 B1 | 8/2003 | Coffee et al. |
| 6,618,668 B1 | 9/2003 | Laird |
| 6,622,083 B1 | 9/2003 | Drury et al. |
| 6,629,034 B1 | 9/2003 | Kozak et al. |
| 6,634,329 B2 | 10/2003 | Kusano et al. |
| 6,636,790 B1 | 10/2003 | Lightner et al. |
| 6,648,770 B1 | 11/2003 | Snyder |
| 6,664,922 B1 | 12/2003 | Fan |
| 6,675,635 B2 | 1/2004 | Kasen et al. |
| 6,711,404 B1 | 3/2004 | Apree et al. |
| 6,711,408 B1 | 3/2004 | Raith |
| 6,731,925 B2 | 5/2004 | Naboulsi |
| 6,732,031 B1 | 5/2004 | Lightner et al. |
| 6,741,938 B2 | 5/2004 | Berndorfer |
| 6,745,153 B2 | 6/2004 | White et al. |
| 6,763,903 B2 | 7/2004 | Morimoto et al. |
| 6,772,142 B1 | 8/2004 | Kelling et al. |
| 6,775,642 B2 | 8/2004 | Remboski et al. |
| 6,778,888 B2 | 8/2004 | Cataldo et al. |
| 6,792,352 B1 | 9/2004 | Hoffmann et al. |
| 6,801,850 B1 | 10/2004 | Wolfson |
| 6,802,291 B2 | 10/2004 | Ujifusa |
| 6,819,267 B1 | 11/2004 | Edmark |
| 6,819,988 B2 | 11/2004 | Dietz et al. |
| 6,832,140 B2 | 12/2004 | Fan et al. |
| 6,832,141 B2 | 12/2004 | Skeen et al. |
| 6,840,093 B2 | 1/2005 | Kasen et al. |
| 6,847,871 B2 | 1/2005 | Malik et al. |
| 6,850,823 B2 | 2/2005 | Eun et al. |
| 6,853,842 B1 | 2/2005 | Wilson et al. |
| 6,857,262 B2 | 2/2005 | Rendahl et al. |
| 6,859,039 B2 | 2/2005 | Horie et al. |
| 6,865,457 B1 | 3/2005 | Mittelsteadt et al. |
| 6,868,386 B1 | 3/2005 | Henderson et al. |
| 6,879,910 B2 | 4/2005 | Shike et al. |
| 6,879,969 B2 | 4/2005 | Engstroem et al. |
| 6,895,329 B1 | 5/2005 | Wolfson |
| 6,909,947 B2 | 6/2005 | Douros et al. |
| 6,911,830 B2 | 6/2005 | Heremans et al. |
| 6,915,128 B1 | 7/2005 | Oh |
| 6,919,821 B1 | 7/2005 | Smith |
| 6,920,779 B2 | 7/2005 | Carlstrom et al. |
| 6,925,425 B2 | 8/2005 | Remboski et al. |
| 6,928,280 B1 | 8/2005 | Xanthos et al. |
| 6,931,235 B2 | 8/2005 | Kline et al. |
| 6,933,842 B2 | 8/2005 | Oesterling et al. |
| 6,947,827 B2 | 9/2005 | Fuse et al. |
| 6,960,168 B2 | 11/2005 | Yanagidaira et al. |
| 6,975,928 B2 | 12/2005 | Timko et al. |
| 7,002,579 B2 | 2/2006 | Olson |
| 7,003,289 B1 | 2/2006 | Kolls |
| 7,016,771 B2 | 3/2006 | Watkins et al. |
| 7,024,306 B2 | 4/2006 | Minami et al. |
| 7,027,808 B2 | 4/2006 | Wesby |
| 7,031,663 B2 | 4/2006 | Heinonen et al. |
| 7,034,683 B2 | 4/2006 | Ghazarian |
| 7,062,264 B2 | 6/2006 | Ko et al. |
| 7,075,421 B1 | 7/2006 | Tuttle |
| 7,076,505 B2 | 7/2006 | Campbell |
| 7,089,198 B2 | 8/2006 | Freedenberg et al. |
| 7,089,784 B2 | 8/2006 | Jakoby et al. |
| 7,090,134 B2 | 8/2006 | Ramsager |
| 7,099,669 B2 | 8/2006 | Sheffield |
| 7,107,150 B2 | 9/2006 | Iwamura et al. |
| 7,113,793 B2 | 9/2006 | Veerasamy et al. |
| 7,113,839 B2 | 9/2006 | Ferguson et al. |
| 7,146,264 B2 | 12/2006 | Bates et al. |
| 7,155,321 B2 | 12/2006 | Bromley et al. |
| 7,161,688 B1 | 1/2007 | Bonner et al. |
| 7,162,339 B2 | 1/2007 | Nguyen |
| 7,173,632 B2 | 2/2007 | Inokuchi et al. |
| 7,174,301 B2 | 2/2007 | Florance et al. |
| 7,212,122 B2 | 5/2007 | Gloekler et al. |
| 7,216,037 B2 | 5/2007 | Graulich et al. |
| 7,236,779 B2 | 6/2007 | Lahav et al. |
| 7,248,159 B2 | 7/2007 | Smith |
| 7,251,558 B1 | 7/2007 | McGrath |
| 7,257,396 B2 | 8/2007 | Olsen et al. |
| 7,263,419 B2 | 8/2007 | Wheals et al. |
| 7,266,435 B2 | 9/2007 | Wang |
| 7,271,716 B2 | 9/2007 | Nou et al. |
| 7,289,786 B2 | 10/2007 | Krasner |
| 7,292,152 B2 | 11/2007 | Torkkola et al. |
| 7,299,125 B2 | 11/2007 | Marks et al. |
| 7,302,371 B2 | 11/2007 | Oesterling et al. |
| 7,309,178 B2 | 12/2007 | Ikeda |
| 7,313,530 B2 | 12/2007 | Smith et al. |
| 7,317,975 B2 | 1/2008 | Woolford et al. |
| 7,327,258 B2 | 2/2008 | Fast et al. |
| 7,333,820 B2 | 2/2008 | Sheha et al. |
| 7,343,174 B2 | 3/2008 | Suryanarayana et al. |
| 7,349,782 B2 | 3/2008 | Churchill et al. |
| 7,356,392 B2 | 4/2008 | Hubbard et al. |
| 7,358,857 B1 | 4/2008 | White |
| 7,385,529 B2 | 6/2008 | Hersh et al. |
| 7,389,178 B2 | 6/2008 | Raz et al. |
| 7,394,393 B2 | 7/2008 | Zhang et al. |
| 7,395,140 B2 | 7/2008 | Christie et al. |
| 7,400,954 B2 | 7/2008 | Sumcad et al. |
| 7,409,274 B2 | 8/2008 | Grana et al. |
| 7,412,398 B1 | 8/2008 | Bailey |
| 7,430,471 B2 | 9/2008 | Simon |
| 7,444,311 B2 | 10/2008 | Engstrom et al. |
| 7,457,693 B2 | 11/2008 | Olsen et al. |
| 7,463,951 B2 | 12/2008 | Ampunan et al. |
| 7,469,827 B2 | 12/2008 | Katragadda et al. |
| 7,480,551 B1 | 1/2009 | Lowrey et al. |
| 7,486,181 B2 | 2/2009 | Olsen et al. |
| 7,487,036 B2 | 2/2009 | Kim |
| 7,489,996 B2 | 2/2009 | Gowan et al. |
| 7,515,302 B2 | 4/2009 | Furuta |
| 7,523,159 B1 | 4/2009 | Williams et al. |
| 7,532,958 B2 | 5/2009 | Powers et al. |
| 7,536,457 B2 | 5/2009 | Miller |
| 7,542,915 B2 | 6/2009 | Kendrick |
| 7,554,441 B2 | 6/2009 | Viegers et al. |
| 7,561,054 B2 | 7/2009 | Raz et al. |
| 7,564,377 B2 | 7/2009 | Kimchi et al. |
| 7,565,230 B2 | 7/2009 | Gardner et al. |
| 7,571,036 B2 | 8/2009 | Olsen et al. |
| 7,571,111 B2 | 8/2009 | Ahrens et al. |
| 7,584,033 B2 | 9/2009 | Mittelsteadt et al. |
| 7,587,276 B2 | 9/2009 | Gold et al. |
| 7,589,619 B2 | 9/2009 | DeKeuster et al. |
| 7,599,786 B2 | 10/2009 | Utsumi et al. |
| 7,599,843 B2 | 10/2009 | Watkins et al. |
| 7,603,138 B2 | 10/2009 | Zhang et al. |
| 7,616,217 B2 | 11/2009 | Dayan et al. |
| 7,619,515 B2 | 11/2009 | Valania |
| 7,627,406 B2 | 12/2009 | Wang et al. |
| 7,627,535 B2 | 12/2009 | Brockman et al. |
| 7,659,827 B2 | 2/2010 | Gunderson et al. |
| 7,672,774 B2 | 3/2010 | Glaza et al. |
| 7,676,306 B2 | 3/2010 | Kubo et al. |
| 7,683,774 B2 | 3/2010 | Olsen et al. |
| 7,705,743 B2 | 4/2010 | Barone et al. |
| 7,706,938 B2 | 4/2010 | Palladino |
| 7,714,705 B2 | 5/2010 | Rennie et al. |
| 7,715,961 B1 | 5/2010 | Kargupta |
| 7,725,216 B2 | 5/2010 | Kim |
| 7,739,007 B2 | 6/2010 | Logsdon |
| 7,765,058 B2 | 7/2010 | Doering |
| 7,769,499 B2 | 8/2010 | McQuade et al. |

(56) References Cited

U.S. PATENT DOCUMENTS

| | | |
|---|---|---|
| 7,774,130 B2 | 8/2010 | Pepper |
| 7,778,752 B1 | 8/2010 | Hunt et al. |
| 7,786,895 B2 | 8/2010 | Zoladek et al. |
| 7,788,005 B2 | 8/2010 | Enomoto et al. |
| 7,789,796 B2 | 9/2010 | Choi |
| 7,805,233 B2 | 9/2010 | Gowan et al. |
| 7,860,636 B2 | 12/2010 | Yamaguchi |
| 7,860,637 B2 | 12/2010 | Yamaguchi |
| 7,877,198 B2 | 1/2011 | Tenzer et al. |
| 7,880,767 B2 | 2/2011 | Chinigo |
| 7,881,838 B2 | 2/2011 | Larschan et al. |
| 7,903,001 B2 | 3/2011 | Sheha et al. |
| 7,912,502 B2 | 3/2011 | Ando et al. |
| 7,912,641 B2 | 3/2011 | Osentoski et al. |
| 7,912,796 B2 | 3/2011 | Engstroem et al. |
| 7,913,179 B2 | 3/2011 | Sheha et al. |
| 7,917,253 B2 | 3/2011 | Inbarajan et al. |
| 7,917,852 B2 | 3/2011 | Wattenberg et al. |
| 7,920,944 B2 | 4/2011 | Gould et al. |
| 7,925,982 B2 | 4/2011 | Parker et al. |
| 7,925,985 B2 | 4/2011 | Moore |
| 7,982,764 B2 | 7/2011 | Kadaba |
| 7,991,407 B2 | 8/2011 | McCormick et al. |
| 7,996,235 B2 | 8/2011 | Laghrari et al. |
| 8,005,589 B2 | 8/2011 | MacDonald et al. |
| 8,046,167 B2 | 10/2011 | Mishra et al. |
| 8,069,412 B2 | 11/2011 | Bankston et al. |
| 8,078,393 B2 | 12/2011 | Ohi |
| 8,078,485 B1 | 12/2011 | Kraehmueller et al. |
| 8,146,009 B2 | 3/2012 | Mason et al. |
| 8,195,630 B2 | 6/2012 | Ellis et al. |
| 8,214,142 B2 | 7/2012 | Cerecke et al. |
| 8,249,910 B2 | 8/2012 | Wellman et al. |
| 8,275,508 B1 | 9/2012 | Adams et al. |
| 8,275,522 B1 | 9/2012 | Groeneweg et al. |
| 8,284,069 B2 | 10/2012 | Sverrisson |
| 8,290,701 B2 | 10/2012 | Mason et al. |
| 8,315,802 B2 | 11/2012 | Brown |
| 8,330,626 B1 | 12/2012 | Adelson |
| 8,386,283 B2 | 2/2013 | Hand |
| 8,416,067 B2 | 4/2013 | Davidson et al. |
| 8,484,059 B2 | 7/2013 | Bankston et al. |
| 8,732,019 B2 | 5/2014 | Brown et al. |
| 8,775,960 B1 | 7/2014 | Flores |
| 9,070,100 B2 | 6/2015 | Davidson |
| 9,117,190 B2 | 8/2015 | Davidson |
| 9,129,449 B2 | 9/2015 | Davidson |
| 2001/0012976 A1 | 8/2001 | Menig et al. |
| 2001/0018628 A1 | 8/2001 | Jenkins et al. |
| 2001/0029425 A1 | 10/2001 | Myr |
| 2002/0008621 A1 | 1/2002 | Barritz et al. |
| 2002/0024448 A1 | 2/2002 | Olesen |
| 2002/0029108 A1 | 3/2002 | Liu et al. |
| 2002/0032517 A1 | 3/2002 | Buckelew et al. |
| 2002/0044084 A1 | 4/2002 | Itoh et al. |
| 2002/0077742 A1 | 6/2002 | Mintz |
| 2002/0077750 A1 | 6/2002 | McDonald et al. |
| 2003/0014286 A1 | 1/2003 | Cappellini |
| 2003/0083060 A1 | 5/2003 | Menendez |
| 2003/0114206 A1 | 6/2003 | Timothy et al. |
| 2003/0120584 A1 | 6/2003 | Zarefoss et al. |
| 2003/0135304 A1 | 7/2003 | Sroub et al. |
| 2003/0144985 A1 | 7/2003 | Ebert |
| 2003/0149607 A1 | 8/2003 | Ogasawara et al. |
| 2003/0149674 A1 | 8/2003 | Good et al. |
| 2003/0163287 A1 | 8/2003 | Vock et al. |
| 2003/0195676 A1 | 10/2003 | Kelly et al. |
| 2003/0197612 A1 | 10/2003 | Tanaka et al. |
| 2003/0224806 A1 | 12/2003 | Hebron |
| 2004/0039504 A1 | 2/2004 | Coffee et al. |
| 2004/0054607 A1 | 3/2004 | Waddington et al. |
| 2004/0090628 A1 | 5/2004 | Ershov et al. |
| 2004/0178902 A1 | 9/2004 | Koike et al. |
| 2004/0193466 A1 | 9/2004 | Kull et al. |
| 2004/0195320 A1 | 10/2004 | Ramsager |
| 2004/0229560 A1 | 11/2004 | Maloney |
| 2004/0249557 A1 | 12/2004 | Harrington et al. |
| 2004/0254698 A1 | 12/2004 | Hubbard et al. |
| 2004/0260585 A1 | 12/2004 | Spangenberg et al. |
| 2005/0044906 A1 | 3/2005 | Spielman |
| 2005/0065711 A1 | 3/2005 | Dahlgren et al. |
| 2005/0073443 A1 | 4/2005 | Sheha et al. |
| 2005/0125148 A1 | 6/2005 | Van Buer et al. |
| 2005/0131627 A1 | 6/2005 | Ignatin |
| 2005/0134504 A1 | 6/2005 | Harwood et al. |
| 2005/0140523 A1 | 6/2005 | Publicover |
| 2005/0143889 A1 | 6/2005 | Isaji et al. |
| 2005/0216553 A1 | 9/2005 | Mallonee et al. |
| 2005/0283699 A1 | 12/2005 | Nomura et al. |
| 2006/0047379 A1 | 3/2006 | Schullian et al. |
| 2006/0055564 A1 | 3/2006 | Olsen et al. |
| 2006/0095175 A1 | 5/2006 | deWaal et al. |
| 2006/0100779 A1 | 5/2006 | Vergin |
| 2006/0142934 A1 | 6/2006 | Kim |
| 2006/0145837 A1 | 7/2006 | Horton |
| 2006/0161315 A1 | 7/2006 | Lewis et al. |
| 2006/0164232 A1 | 7/2006 | Waterhouse et al. |
| 2006/0206261 A1 | 9/2006 | Altaf et al. |
| 2006/0208722 A1 | 9/2006 | Takemasa et al. |
| 2006/0265228 A1 | 11/2006 | Ando |
| 2006/0271246 A1 | 11/2006 | Bell et al. |
| 2007/0027726 A1 | 2/2007 | Warren et al. |
| 2007/0051544 A1 | 3/2007 | Fernandez |
| 2007/0093943 A1 | 4/2007 | Nelson et al. |
| 2007/0115101 A1 | 5/2007 | Creekbaum et al. |
| 2007/0126605 A1 | 6/2007 | Aleksic et al. |
| 2007/0174004 A1 | 7/2007 | Tenzer et al. |
| 2007/0179680 A1 | 8/2007 | Tamura |
| 2007/0226041 A1 | 9/2007 | Oesterling et al. |
| 2007/0239346 A1 | 10/2007 | Hawkins |
| 2007/0241882 A1 | 10/2007 | Panttaja et al. |
| 2007/0244633 A1 | 10/2007 | Phillips et al. |
| 2007/0271014 A1 | 11/2007 | Breed |
| 2008/0016504 A1 | 1/2008 | Cheng et al. |
| 2008/0045245 A1 | 2/2008 | Billmaier et al. |
| 2008/0091681 A1 | 4/2008 | Dwivedi et al. |
| 2008/0097731 A1 | 4/2008 | Lanes et al. |
| 2008/0125724 A1 | 5/2008 | Monroe |
| 2008/0140287 A1 | 6/2008 | Yang et al. |
| 2008/0140654 A1 | 6/2008 | Daley |
| 2008/0143834 A1 | 6/2008 | Comeau et al. |
| 2008/0154691 A1 | 6/2008 | Wellman et al. |
| 2008/0162036 A1 | 7/2008 | Breed |
| 2008/0177646 A1 | 7/2008 | Frink |
| 2008/0252487 A1 | 10/2008 | McClellan et al. |
| 2008/0255722 A1 | 10/2008 | McClellan et al. |
| 2008/0255888 A1 | 10/2008 | Berkobin et al. |
| 2008/0262670 A1 | 10/2008 | McClellan et al. |
| 2008/0269978 A1 | 10/2008 | Shirole et al. |
| 2008/0270519 A1 | 10/2008 | Ekdahl et al. |
| 2008/0285886 A1 | 11/2008 | Allen |
| 2008/0307491 A1 | 12/2008 | Duri et al. |
| 2008/0319602 A1 | 12/2008 | McClellan et al. |
| 2009/0007098 A1 | 1/2009 | Chevrette et al. |
| 2009/0024419 A1 | 1/2009 | McClellan et al. |
| 2009/0030574 A1 | 1/2009 | Yamakado et al. |
| 2009/0045924 A1 | 2/2009 | Roberts, Sr. et al. |
| 2009/0051566 A1 | 2/2009 | Olsen et al. |
| 2009/0055091 A1 | 2/2009 | Hines et al. |
| 2009/0070027 A1 | 3/2009 | Newhouse et al. |
| 2009/0088924 A1 | 4/2009 | Coffee et al. |
| 2009/0102638 A1 | 4/2009 | Olsen et al. |
| 2009/0112396 A1 | 4/2009 | Tsai et al. |
| 2009/0114575 A1 | 5/2009 | Carpenter et al. |
| 2009/0177350 A1 | 7/2009 | Williams et al. |
| 2009/0216434 A1 | 8/2009 | Panganiban et al. |
| 2009/0248235 A1 | 10/2009 | Hering et al. |
| 2009/0248236 A1 | 10/2009 | Schwinke |
| 2009/0248237 A1 | 10/2009 | Koepf et al. |
| 2009/0271057 A1 | 10/2009 | Stone |
| 2009/0281929 A1 | 11/2009 | Boitet et al. |
| 2009/0287369 A1 | 11/2009 | Nielsen |
| 2009/0287739 A1 | 11/2009 | Zhang et al. |
| 2009/0306997 A1 | 12/2009 | Betancourt |

(56) References Cited

U.S. PATENT DOCUMENTS

| | | |
|---|---|---|
| 2009/0318121 A1 | 12/2009 | Marumoto |
| 2009/0319119 A1 | 12/2009 | Park et al. |
| 2009/0319341 A1 | 12/2009 | Berkobin et al. |
| 2009/0326753 A1 | 12/2009 | Chen et al. |
| 2009/0326991 A1 | 12/2009 | Wei et al. |
| 2010/0010732 A1 | 1/2010 | Hartman |
| 2010/0030582 A1 | 2/2010 | Rippel et al. |
| 2010/0030586 A1 | 2/2010 | Taylor et al. |
| 2010/0035602 A1 | 2/2010 | Doherty et al. |
| 2010/0036591 A1 | 2/2010 | Nakai |
| 2010/0042311 A1 | 2/2010 | Nakai |
| 2010/0057356 A1 | 3/2010 | Lin |
| 2010/0059007 A1 | 3/2010 | Senda et al. |
| 2010/0061190 A1 | 3/2010 | Nelson |
| 2010/0063850 A1 | 3/2010 | Daniel |
| 2010/0070153 A1 | 3/2010 | Bradley et al. |
| 2010/0082230 A1 | 4/2010 | Hong et al. |
| 2010/0087984 A1 | 4/2010 | Joseph |
| 2010/0088163 A1 | 4/2010 | Davidson et al. |
| 2010/0090852 A1 | 4/2010 | Eitan et al. |
| 2010/0094688 A1 | 4/2010 | Olsen, III et al. |
| 2010/0094769 A1 | 4/2010 | Davidson et al. |
| 2010/0100315 A1 | 4/2010 | Davidson et al. |
| 2010/0100507 A1 | 4/2010 | Davidson et al. |
| 2010/0127843 A1 | 5/2010 | Koenig |
| 2010/0131152 A1 | 5/2010 | Castonguay et al. |
| 2010/0131308 A1 | 5/2010 | Collopy et al. |
| 2010/0138242 A1 | 6/2010 | Ferrick et al. |
| 2010/0153005 A1 | 6/2010 | Cerecke et al. |
| 2010/0168992 A1 | 7/2010 | Nakata |
| 2010/0174485 A1 | 7/2010 | Taylor et al. |
| 2010/0179844 A1 | 7/2010 | LaFergola et al. |
| 2010/0185356 A1 | 7/2010 | Haas et al. |
| 2010/0191403 A1 | 7/2010 | Krause |
| 2010/0205012 A1 | 8/2010 | McClellan |
| 2010/0205022 A1 | 8/2010 | Brown |
| 2010/0211259 A1 | 8/2010 | McClellan |
| 2010/0212629 A1 | 8/2010 | McDonald et al. |
| 2010/0217480 A1 | 8/2010 | Link, II |
| 2010/0217524 A1 | 8/2010 | Oohashi et al. |
| 2010/0228404 A1 | 9/2010 | Link, II et al. |
| 2010/0229815 A1 | 9/2010 | Senda et al. |
| 2010/0235092 A1 | 9/2010 | Kutomi |
| 2010/0245123 A1 | 9/2010 | Prasad et al. |
| 2010/0250021 A1 | 9/2010 | Cook et al. |
| 2010/0250059 A1 | 9/2010 | Sekiyama et al. |
| 2010/0262333 A1 | 10/2010 | Storgaard |
| 2010/0262450 A1 | 10/2010 | Kalish et al. |
| 2010/0265052 A1 | 10/2010 | Koen |
| 2010/0274440 A1 | 10/2010 | Kim et al. |
| 2010/0305805 A1 | 12/2010 | Yamaguchi |
| 2010/0305807 A1 | 12/2010 | Basir et al. |
| 2011/0015851 A1 | 1/2011 | Burr et al. |
| 2011/0035139 A1 | 2/2011 | Konlditslotis et al. |
| 2011/0039587 A1 | 2/2011 | Madhavan et al. |
| 2011/0040438 A1 | 2/2011 | Kluge et al. |
| 2011/0040477 A1 | 2/2011 | Eser et al. |
| 2011/0041088 A1 | 2/2011 | Mason et al. |
| 2011/0046845 A1 | 2/2011 | Kozlay |
| 2011/0050732 A1 | 3/2011 | Arrasvuori |
| 2011/0054767 A1 | 3/2011 | Schafer et al. |
| 2011/0057784 A1 | 3/2011 | Nakamura et al. |
| 2011/0068954 A1 | 3/2011 | McQuade et al. |
| 2011/0071740 A1 | 3/2011 | Nihei et al. |
| 2011/0078024 A1 | 3/2011 | Messier et al. |
| 2011/0090075 A1 | 4/2011 | Armitage et al. |
| 2011/0098880 A1 | 4/2011 | Basir et al. |
| 2011/0101610 A1 | 5/2011 | Mayalidag |
| 2011/0102167 A1 | 5/2011 | Baur et al. |
| 2011/0112717 A1 | 5/2011 | Resner |
| 2011/0112740 A1 | 5/2011 | Hashimoto |
| 2011/0112870 A1 | 5/2011 | Berg et al. |
| 2011/0118934 A1 | 5/2011 | Lowrey et al. |
| 2011/0122858 A1 | 5/2011 | Yashiro et al. |
| 2011/0130906 A1 | 6/2011 | Mayer |
| 2011/0130916 A1 | 6/2011 | Mayer |
| 2011/0130960 A1 | 6/2011 | Sheha et al. |
| 2011/0137489 A1 | 6/2011 | Gilleland et al. |
| 2011/0137511 A1 | 6/2011 | Harumoto et al. |
| 2011/0137684 A1 | 6/2011 | Peak et al. |
| 2011/0143669 A1 | 6/2011 | Farrell et al. |
| 2011/0153367 A1 | 6/2011 | Amigo et al. |
| 2011/0161118 A1 | 6/2011 | Borden et al. |
| 2011/0163896 A1 | 7/2011 | Chinigo |
| 2011/0178695 A1 | 7/2011 | Okumoto et al. |
| 2011/0196644 A1 | 8/2011 | Davidson et al. |
| 2011/0205043 A1 | 8/2011 | Fujiki et al. |
| 2011/0205044 A1 | 8/2011 | Enomoto et al. |
| 2011/0210838 A1 | 9/2011 | Fujiki et al. |
| 2011/0225098 A1 | 9/2011 | Wolff et al. |
| 2011/0238457 A1 | 9/2011 | Mason et al. |
| 2011/0238543 A1 | 9/2011 | Paez et al. |
| 2011/0298638 A1 | 12/2011 | Groeneweg |
| 2012/0030133 A1 | 2/2012 | Rademaker |
| 2012/0226390 A1 | 9/2012 | Adams et al. |
| 2012/0232939 A1 | 9/2012 | Pierre et al. |
| 2012/0253587 A1 | 10/2012 | Davidson |
| 2012/0253668 A1 | 10/2012 | Sheha et al. |
| 2012/0253888 A1 | 10/2012 | Davidson |

FOREIGN PATENT DOCUMENTS

| | | |
|---|---|---|
| EP | 0 635 800 A1 | 1/1995 |
| EP | 0 977 450 A2 | 2/2000 |
| EP | 1113268 | 7/2001 |
| EP | 1 216 901 A1 | 6/2002 |
| EP | 1 229 508 | 8/2002 |
| EP | 1566665 | 8/2005 |
| FR | 2710767 | 9/1993 |
| FR | 2831665 | 10/2001 |
| GB | 2 225 459 A | 5/1990 |
| GB | 2 358 427 A | 7/2001 |
| GB | 2 363 884 A | 1/2002 |
| JP | 3251351 | 11/1991 |
| JP | H6-333117 | 12/1994 |
| JP | 07-199861 | 8/1995 |
| JP | 3062509 | 7/1999 |
| JP | 2000/059292 | 2/2000 |
| JP | 2000/295168 | 10/2000 |
| JP | 2001/024577 | 1/2001 |
| JP | 2001/218252 | 8/2001 |
| JP | 2001/278414 | 10/2001 |
| JP | 2002/112302 | 4/2002 |
| JP | 2002/335202 | 11/2002 |
| WO | WO 96/31846 | 10/1996 |
| WO | WO 01/91438 A1 | 11/2001 |
| WO | WO 03/014752 A1 | 2/2003 |
| WO | WO 03/081560 A1 | 10/2003 |
| WO | WO 2005/069203 | 7/2005 |
| WO | WO 2005/109273 A1 | 11/2005 |
| WO | WO 2006/065492 | 6/2006 |
| WO | WO 2010/030341 A1 | 3/2010 |
| WO | WO 2011/020101 A2 | 2/2011 |
| WO | WO 2011/036495 A2 | 3/2011 |

OTHER PUBLICATIONS

"Oil Lasts Longer in Diesels, thanks to novel viscosity sensor", Dec. 14, 2006, pp. 1-3; http://machinedesign.com/ContentItem/57322/Oillastslongerindieselsthankstonovelviscositysensor.aspx.

"On—The New World of Communication: Notes: Tools for Precision: A Tool Kit to Optimize WCDMA Networks," www.ericsson.com/tems; date of publication unknown; one page, numbered p. 46.

"TEMS™—Making Wireless Better," by Ericcson; APAC Workshop (Sep. 2004); seventeen pages.

"TEMS™ Automatic WCDMA: Take Control of Your Mobile Internet Quality of Service," wwww.ericsson.com; Publication AE/LZT 123 6694 R1; date of publication unknown (copyright 2001); two pages.

"TEMS™ Automatic: Making Wireless Better: Take Control of Your Mobile Internet Quality of Service," www.ericsson.com/services/tems/_cdma/automatic-cdma.shtml; Oct. 19, 2004; two pages.

(56) References Cited

OTHER PUBLICATIONS

"TEMS™ Automatic: Streamlined Operations and Improved QoS: GSM/GPRS, CDMA, and TDMA," www.ericsson.com/tems; Publication 287 01-FAP 901 0409 B; date of publication unknown (copyright 2004); four pages.
"TEMS™ Drive Tester CDMA: An Innovative Drive Test Solution," www.ericsson.com/tems; Publication AE/LZT 123 7307, R3; date of publication unknown (copyright 2003); four pages.
"TEMS™ Drive Tester CDMA: An Innovative Drive Test Solution," www.ericsson.com/tems; Publication 287 01-FAP 901 0539 Uen; date of publication unknown (copyright 2005); four pages.
"TEMS™ DRIVETESTER CDMA2000 2.0: An Innovative Drive Test Networks," www.ericsson.com/products/_TEMSdrivetesterCDMA200020pos.shtml; date of publication unknown; one page.
"TEMS™ Tech Support: TEMS Automatic GSM: Making Wireless Better: Take Control of Your Mobile Internet Quality of Service," FAQ's www.ericsson.com/services/tems/support/automatic/sup_automatic_gsm.shtml; Nov. 5, 2004; three pages, version 3.2.1.
"TEMS™ Tech Support: TEMS DriveTester CDMA: Making Wireless Better: Instantly Isolate Network Trouble Spots,"FAQ's www.ericsson.com/services/tems/support/drivetester/_sup_drivetester_cdma.shtml; Jun. 9, 2004; two pages; version 2.0.1.
"TEMS™ Tech Support: TEMS DriveTester GSM/TDMA: Making Wireless Better: Instantly Isolate Network Trouble Spots," www.ericsson.com/services/tems/support/drivetester/sup_drivetester_gsm_tdma.shtml; May 13, 2004; two pages; version 1.1.1.
"TEMS™ Tech Support: TEMS LinkPlanner: Making Wireless Better: FAQ's, Import/Export:" www.ericsson.com/services/tems/support/_linkplanner/sup_linkplanner_faq_import.shtml; Aug. 26, 2004; two pages.
"TEMS™0 Tech Support: TEMS LinkPlanner: Making Wireless Better: FAQ's: Map Data," www.ericsson.com/services/tems/support/_linkplanner/sup_linkplanner_faq_mapdata.shtml; date of publication unknown; one page.
"TEMS™ Tech Support: TEMS LinkPlanner: Making Wireless Better: FAQ's: General," www.ericsson.com/services/tems/support/_linkplanner/sup_linkplanner_faq_general.shtml; Sep. 10, 2004; one page.
"White Paper: Business Value Through Fleet Management Optimization", Cadec Global Inc., Nov. 2007, 19 pages.
Advanced Vehicle Telematics—Telogis Fleet, Telogis, Feb. 2010.
Barringer & Associates, Inc., Pareto Principle (available at http://www.barringer1.com/anvil_files/anvil04.htm) captured Sep. 8, 2008.
Bing.com/Maps—Bing Maps Platform—web pages Microsoft, Feb. 2010, Retrieved from Archive.org Jul. 19, 2013.
Canadian Intellectual Property Office, Examiner Requisition for Application No. 2,736,168, Jun. 12, 2013, 4 pages, Canada.
Cloin, Lauren, et al., Fleet Telematics Becoming a 'Must-Have' Automotive Fleet, Feb. 2007.
Cooney, Ryan, "Tracking Geocortex Fleet Tracker", *Geocortex Blog*, Aug. 24, 2009, 1 page, retrieved from <http://blog.geocortex.com/2009/08/24/tracking-geocortex-fleet-tracker/> on Sep. 25, 2014.
European Patent Office, Communication Pursuant to Article 94(3) EPC for Application No. 09813349.9, Aug. 29, 2014, 7 pages, The Netherlands.
European Patent Office, Extended European Search Report for Application No. 09813349.9, Nov. 20, 2013, 6 pages, The Netherlands.
Geocortex Fleet Tracker User Guide Latitude Geographics Group, Ltd. Nov. 2010.
Golias, Mihalis, et al., GPS/GIS Analysis of Tennessee Truck Trips The Univerity of Memphis, Dec. 7, 2012.
Hedin, Lars-Göran, Editor; "On: The New World of Communication," an Ericsson global customer magazine (Mar. 2002); sixteen pages.
Hillier, Amy, "ArcGIS 9.3 Manual", SelectedWorkds by Amy Hillier, Jan. 2007, University of Pennsylvania, 110 pages, USA.

Howard County Bureau of Highways Web-enabled Snowplow Tracking System, Howard County Maryland, 1999.
International Preliminary Report on Patentability for Application No. PCT/US2005/000729 dated Jul. 17, 2006.
International Preliminary Report on Patentability for Application No. PCT/US2005/000789 dated Jul. 17, 2006.
International Preliminary Report on Patentability for Application No. PCT/US2009/004978, dated Dec. 23, 2010.
International Preliminary Report on Patentability for Application No. PCT/US2009/005049 dated Aug. 20, 2010.
International Preliminary Report on Patentability for Application No. PCT/US2009/056063, dated Dec. 23, 2010.
International Search Report and Written Opinion for PCT/US2005/000729 dated Jan. 10, 2006.
International Search Report and Written Opinion for PCT/US2005/000789 dated Jan. 10, 2006.
International Search Report and Written Opinion from International Application No. PCT/US2009/004978 mailed Jan. 12, 2010.
International Search Report and Written Opinion from International Application No. PCT/US09/05049 mailed Oct. 28, 2009.
International Search Report and Written Opinion from International Application No. PCT/US2009/056063 mailed Jan. 12, 2010.
International Search Report for PCT/US2005/000789 dated Oct. 26, 2005.
International Searching Authority, International Search Report and Written Opinion for International Application No. PCT/US2012/048405, Dec. 19, 2012, 10 pages, United States Patent and Trademark Office, USA.
International Searching Authority, International Search Report and Written Opinion for International Application No. PCT/US2012/031172, Dec. 27, 2012, 11 pages, United States Patent and Trademark Office, USA.
International Searching Authority, International Search Report and Written Opinion for International Application No. PCT/US2014/034323, Nov. 7, 2014, 10 pages, United States Patent and Trademark Office, USA.
Kruse, John, Snow and Ice go High-Tech, Mobile Radio Technology, Oct. 1, 1999.
Lenarcic, Robert, Off the Shelf Approach to ArcGIS Server & The Dashboard Approach to Gaining Insight to ArcGIS Server Latitude Geographics Group Ltd., Northeast Arc Users Group, NEARC, 2008.
Lo, Grace, Introduction to ArcGIS Tracking Analyst, Texas A&M University, Dec. 2007.
Ma, Xiaolei, et al., Processing Commercial GPS Data to Develop a Web-Based Truck Performance Measures Program, University of Washington, Mar. 15, 2011.
McCormack, Edward D., Developing a GPS-Based Truck Freight Performance Measure Platform, Washington State Department of Transportation, Apr. 2010.
McLean, Brett, Tracking Geocortex Fleet Tracker, Geocortex Blog, Aug. 24, 2009.
Murphy, Jean V., "Yard Management Systems Extend Automation Beyond the Dock Door", SupplyChainBrain.com, Mar. 2005, Global Logistic & Supply Chain Strategies.
Notice of Allowance and Fees Due for U.S. Appl. No. 12/556,140 mailed May 4, 2012.
Notice of Allowance and Fees Due from U.S. Appl. No. 12/254,031 mailed Mar. 30, 2009.
Office Action from U.S. Appl. No. 12/254,031 mailed Jan. 15, 2009.
On the Go FedEx GIS Tracking Operations ESRI, 2011.
Resource Optimization & Scheduling—Telogis Route, Telogis, Feb. 2010.
Scapinakis, Dimitris, et al., Communications and Positioning Systems in the Motor Carrier Industry, Institute of Transportation Studies, University of California at Berkley, Research Reports, California Partners for Advanced, Transit and Highways (PATH), Institute of Transportation Studies (UCB), UC Berkeley, Jan. 1, 1992.
Schueneman, Thomas, "Brown Continues Getting Greener: Telematics Helps UPS Squeeze Out Higher Efficiencies and Increased Safety", May 7, 2008, Triplepundit.com, retrieved on Sep. 11, 2014.
Scott, L.M., et al., "A.1 Spatial Statistics in ArcGIS", *Handbook of Applied Spatial Analysis: Software Tools, Methods and Applications*, 2010, pp. 27-41, Springer.

(56) References Cited

OTHER PUBLICATIONS

Sigler, Lisa, Editor; TEMS an Ericsson Newsletter (No. 2, Jun. 2003); eight pages.
Sigler, Lisa, Editor; TEMS an Ericsson Newsletter (No. 2, Q2 2004); eight pages.
Sigler, Lisa, Editor; TEMS an Ericsson Newsletter (No. 3, Q3 2004); eight pages.
Sigler, Lisa; "Assess speech quality with PESQ, now in TEMSTm Automatic;" date of publication unknown; one page.
State Intellectual Property Office of the P.R.C., Third Office Action for Chinese Application No. 200980135226.X, dated Jan. 9, 2014, 7 pages, China.
State Intellectual Property Office of the People's Republic of China, Second Office Action for Application No. 200980135226.X, Mar. 1, 2013, 4 pages, China.
Tai, Hideo, "Urban Gas Monitoring System Using Optical Sensors," Proceedings of the SPIE, Jan. 1999, vol. 3746, pp. 332-336.
Telogis Announces OnTrack 7, Delivering the Latest in Saas GPS Fleet Management Software, Directions Magazine, Oct. 8, 2009.
Telogis Introduces New Advanced Scaleable Fleet Management Platform to European Markets: Telogis 8, Directions Magazine, Dec. 14, 2010.
Telogis, a GPS Fleet Tracking and Productivity Software Provider Launches New Brand and Web Site, Directions Magazine, May 21, 2007.
Telogis.com web pages, Telogis, Inc., Oct. 2007, Retrieved from Archive.org Feb. 4, 2013.
United States Patent and Trademark Office, Corrected Notice of Allowability for U.S. Appl. No. 13/435,498, Dec. 10, 2014, 6 pages, USA.
United States Patent and Trademark Office, Notice of Allowance and Fee(s) Due for U.S. Appl. No. 13/435,498, Nov. 3, 2014, 42 pages, USA.
United States Patent and Trademark Office, Notice of Allowance for U.S. Appl. No. 12/556,140, dated Dec. 12, 2012, 9 pages, USA.
United States Patent and Trademark Office, Notice of Allowance for U.S. Appl. No. 13/799,627, Jul. 18, 2014, 7 pages, USA.
United States Patent and Trademark Office, Notice of Allowance for U.S. Appl. No. 13/940,789, Jan. 22, 2015, 9 pages, USA.
United States Patent and Trademark Office, Notice of Allowance for U.S. Appl. No. 13/940,699, Feb. 2, 2015, 9 pages, USA.
United States Patent and Trademark Office, Notice of Allowance for U.S. Appl. No. 13/940,824, Feb. 18, 2015, 9 pages, USA.
United States Patent and Trademark Office, Office Action for U.S. Appl. No. 13/436,007, dated Apr. 10, 2013, 36 pages, USA.
United States Patent and Trademark Office, Office Action for U.S. Appl. No. 13/435,831, dated Nov. 21, 2012, 33 pages, USA.
United States Patent and Trademark Office, Office Action for U.S. Appl. No. 13/435,934, Feb. 15, 2013, 48 pages, USA.
United States Patent and Trademark Office, Office Action for U.S. Appl. No. 13/307,997, May 16, 2013, 60 pages, USA.
United States Patent and Trademark Office, Office Action for U.S. Appl. No. 13/559,474, Nov. 29, 2013, 52 pages, USA.
United States Patent and Trademark Office, Office Action for U.S. Appl. No. 13/799,627, May 30, 2013, 12 pages, USA.
United States Patent and Trademark Office, Office Action for U.S. Appl. No. 13/799,627, Jan. 6, 2014, 37 pages, USA.
United States Patent and Trademark Office, Office Action for U.S. Appl. No. 13/307,997, Jan. 17, 2014, 40 pages, USA.
United States Patent and Trademark Office, Office Action for U.S. Appl. No. 13/435,934, Jul. 25, 2013, 31 pages, USA.
United States Patent and Trademark Office, Office Action for U.S. Appl. No. 13/435,755, Aug. 2, 2013, 42 pages, USA.
United States Patent and Trademark Office, Office Action for U.S. Appl. No. 13/435,498, Sep. 13, 2013, 20 pages, USA.
United States Patent and Trademark Office, Office Action for U.S. Appl. No. 13/436,083, Sep. 13, 2013, 38 pages, USA.
United States Patent and Trademark Office, Office Action for U.S. Appl. No. 13/436,007, Sep. 26, 2013, 25 pages, USA.
United States Patent and Trademark Office, Office Action for U.S. Appl. No. 13/435,831, Oct. 11, 2013, 25 pages, USA.
United States Patent and Trademark Office, Office Action for U.S. Appl. No. 13/435,755, Apr. 3, 2014, 24 pages, USA.
United States Patent and Trademark Office, Office Action for U.S. Appl. No. 13/436,083, May 6, 2014, 11 pages, USA.
United States Patent and Trademark Office, Office Action for U.S. Appl. No. 13/435,592, Jun. 3, 2014, 51 pages, USA.
United States Patent and Trademark Office, Office Action for U.S. Appl. No. 13/435,498, Jun. 16, 2014, 19 pages, USA.
United States Patent and Trademark Office, Office Action for U.S. Appl. No. 13/559,474, Jun. 18, 2014, 20 pages, USA.
United States Patent and Trademark Office, Office Action for U.S. Appl. No. 13/436,007, Aug. 11, 2014, 31 pages, USA.
United States Patent and Trademark Office, Office Action for U.S. Appl. No. 13/435,831, Aug. 14, 2014, 21 pages, USA.
United States Patent and Trademark Office, Office Action for U.S. Appl. No. 13/435,686, Aug. 14, 2014, 69 pages, USA.
United States Patent and Trademark Office, Office Action for U.S. Appl. No. 13/435,934, Sep. 17, 2014, 36 pages, USA.
United States Patent and Trademark Office, Office Action for U.S. Appl. No. 13/940,789, Oct. 22, 2014, 41 pages, USA.
United States Patent and Trademark Office, Office Action for U.S. Appl. No. 13/940,699, Nov. 5, 2014, 44 pages, USA.
United States Patent and Trademark Office, Office Action for U.S. Appl. No. 13/940,824, Nov. 20, 2014, 44 pages, USA.
United States Patent and Trademark Office, Office Action for U.S. Appl. No. 13/436,007, Dec. 2, 2014, 27 pages, USA.
United States Patent and Trademark Office, Office Action for U.S. Appl. No. 13/435,686, Dec. 26, 2014, 36 pages, USA.
United States Patent and Trademark Office, Office Action for U.S. Appl. No. 13/436,083, Dec. 29, 2014, 9 pages, USA.
United States Patent and Trademark Office, Office Action for U.S. Appl. No. 13/435,831, Dec. 29, 2014, 27 pages, USA.
United States Patent and Trademark Office, Office Action for U.S. Appl. No. 13/435,592, Jan. 16, 2015, 16 pages, USA.
United States Patent and Trademark Office, Office Action for U.S. Appl. No. 13/559,474, Feb. 23, 2015, 27 pages, USA.
United States Patent and Trademark Office, Office Action for U.S. Appl. No. 13/307,997, Feb. 20, 2015, 47 pages, USA.
United States Patent and Trademark Office, Office Action for U.S. Appl. No. 13/940,742, Mar. 3, 2015, 46 pages, USA.
United States Patent and Trademark Office, Supplemental Notice of Allowability for U.S. Appl. No. 13/799,627, Sep. 3, 2014, 3 pages, USA.
U.S. Appl. No. 61/449,044, of USP 2012/0226390, filed Mar. 3, 2011.
Users Guide to Roadnet 5000—Routing & Scheduling System, Version 5.6, Roadnet Technologies, Inc., A United Parcel Service Company, 1996.
Wheeler, Nikki, et al., Multi-Criteria Trucking Freeway Performance Measures in Congested Corridors, Portland State University, Jan. 23-27, 2011.
Wischoff, et al., "SOTIS—a Self-Organizing Traffic Information System," VTC 2003-Spring, the 57th IEEE Semiannual Vehicular Technology Conference, Jeju Korea Apr. 22-25, 2003, vol. 4, pp. 2442-2446.
United States Patent and Trademark Office, Office Action for U.S. Appl. No. 13/435,755, Apr. 2, 2015, 24 pages, USA.
United States Patent and Trademark Office, Office Action for U.S. Appl. No. 13/435,934, Apr. 16, 2015, 36 pages, USA.
United States Patent and Trademark Office, Office Action for U.S. Appl. No. 13/436,007, May 15, 2015, 25 pages, USA.
European Patent Office, Extended European Search Report for Application No. 12743628.5, Feb. 27, 2015, 5 pages, Germany.
International Preliminary Examining Authority, International Preliminary Report on Patentability for International Application No. PCT/US2014/034323, Apr. 23, 2015, 18 pages, United States Patent and Trademark Office, USA.
Canadian Intellectual Property Office, Requisition by the Examiner for Application No. 2,842,842, Oct. 6, 2015, 6 pages, Canada.

(56) References Cited

OTHER PUBLICATIONS

Kruse, John, "Snow and ice go high-tech", MRT, Oct. 1, 1999, 3 pages, retrieved from <http://preview.mrtmag.com/mag/radio_snow_ice_go/> on Sep. 24, 2015.

Sisiopiku, Virginia P., et al., "Winter Road Maintenance—ITS Options", 2001 IEEE Intelligent Transportation Systems Conference Proceedings, Aug. 25-29, 2001, pp. 298-302, IEEE, U.S.A.

United States Patent and Trademark Office, Notice of Allowance for U.S. Appl. No. 13/436,007, Sep. 30, 2015, 12 pages, U.S.A.

United States Patent and Trademark Office, Office Action for U.S. Appl. No. 13/435,755, Oct. 10, 2015, 25 pages, U.S.A.

United States Patent and Trademark Office, Office Action for U.S. Appl. No. 13/435,934, Oct. 16, 2015, 46 pages, U.S.A.

United States Patent and Trademark Office, Office Action for U.S. Appl. No. 14/095,560, Sep. 11, 2015, 49 pages, U.S.A.

United States Patent and Trademark Office, Office Action for U.S. Appl. No. 14/133,258, Nov. 12, 2015, 22 pages, U.S.A.

United States Patent and Trademark Office, Office Action for U.S. Appl. No. 13/435,686, Nov. 23, 2015, 42 pages, U.S.A.

United States Patent and Trademark Office, Office Action for U.S. Appl. No. 13/435,831, Jun. 5, 2015, 23 pages, U.S.A.

United States Patent and Trademark Office, Office Action for U.S. Appl. No. 14/133,258, Jun. 10, 2015, 68 pages, U.S.A.

United States Patent and Trademark Office, Office Action for U.S. Appl. No. 13/436,083, Jun. 9, 2015, 13 pages, U.S.A.

United States Patent and Trademark Office, Notice of Allowance for U.S. Appl. No. 13/940,742, Jun. 30, 2015, 15 pages, U.S.A.

United States Patent and Trademark Office, Office Action for U.S. Appl. No. 13/435,686, Jul. 1, 2015, 41 pages, U.S.A.

United States Patent and Trademark Office, Office Action for U.S. Appl. No. 13/435,592, Jul. 22, 2015, 26 pages, U.S.A.

United States Patent and Trademark Office, Office Action for U.S. Appl. No. 13/559,474, Jul. 27, 2015, 27 pages, U.S.A.

United States Patent and Trademark Office, Notice of Allowance for U.S. Appl. No. 13/307,997, Jul. 28, 2015, 16 pages, U.S.A.

United States Patent and Trademark Office, Office Action for U.S. Appl. No. 14/517,500, Aug. 25, 2015, 46 pages, U.S.A.

European Patent Office, Communication pursuant to Article 94(3) EPC for Application No. 12743628.5, Nov. 2, 2015, 6 pages, Germany.

European Patent Office, Extended European Search Report for Application No. 12717936.4, Nov. 9, 2015, 7 pages, Germany.

United States Patent and Trademark Office, Office Action for U.S. Appl. No. 13/435,831, Jan. 20, 2016, 30 pages, U.S.A.

United States Patent and Trademark Office, Office Action for U.S. Appl. No. 13/435,592, Jan. 21, 2016, 32 pages, U.S.A.

SYSTEMS AND METHODS FOR UTILIZING TELEMATICS DATA TO IMPROVE FLEET MANAGEMENT OPERATIONS

CROSS REFERENCE TO RELATED APPLICATIONS

This patent application is a continuation of U.S. Nonprovisional application Ser. No. 14/517,500 filed Oct. 17, 2014, which is a continuation of U.S. Nonprovisional application Ser. No. 13/799,627 filed Mar. 13, 2013 and now issued as U.S. Pat. No. 8,896,430, which is a continuation of U.S. Nonprovisional application Ser. No. 12/556,140 filed Sep. 9, 2009 and now issued as U.S. Pat. No. 8,416,067, which claims the benefit of U.S. Provisional Application No. 61/095,486, filed Sep. 9, 2008, each of which is herein incorporated by reference in its entirety.

BACKGROUND

Delivery vehicle driver efficiency, avoidance of safety and theft hazards, and optimization of route planning are objectives for transportation companies. Accordingly, there is an ongoing need to develop new technologies to enhance driver efficiency, the avoidance of safety and theft hazards, and route planning.

BRIEF SUMMARY

According to various embodiments of the present invention, a fleet management system is provided for capturing, storing, and analyzing telematics data to improve fleet management operations. Various embodiments of the fleet management system include one or more memory storage areas and one or more processors, wherein the fleet management system is configured to (i) receive telematics data from one or more vehicle sensors associated with a vehicle, the telematics data comprising engine idle data relating to the engine idle time of the vehicle; (ii) associate the telematics data with a particular segment of a vehicle trip; and (iii) execute a step selected from a group consisting of: (a) determining whether the telematics data indicates a potential inefficient operation by a driver of the vehicle and, in response to determining that the telematics data indicates a potential inefficient operation by the driver, generating an alert indicating the potential inefficient operation; (b) determining whether the telematics data indicates a potential safety hazard created by a driver of the vehicle and, in response to determining that the telematics data indicates a potential safety hazard created by the driver, generating an alert indicating the potential safety hazard; and (c) determining whether the telematics data indicates a potential theft hazard created by a driver of the vehicle and, in response to determining that the telematics data indicates a potential theft hazard created by the driver, generating an alert indicating the potential theft hazard.

In another embodiment, the fleet management system includes (a) a fleet of vehicles having one or more vehicle sensors and at least one telematics device; (b) at least one computer network; (c) one or more central servers; and (d) a user interface; wherein the telematics device is configured to: receive telematics data from the one or more vehicle sensors, wherein the telematics data comprises data relating to the engine idle time of the fleet of vehicles; associate the telematics data with contextual data; and transmit the telematics data over the network to the central server; wherein the one or more central servers are configured to: (i) receive telematics data from the telematics device; (ii) execute the steps of: (a) determining whether the telematics data indicates a potential inefficient operation by a driver of the vehicle and, in response to determining that the telematics data indicates a potential inefficient operation by the driver, displaying via the user interface data indicating the potential inefficient operation; (b) determining whether the telematics data indicates a potential safety hazard created by a driver of the vehicle and, in response to determining that the telematics data indicates a potential safety hazard created by the driver, displaying via the user interface data indicating the potential safety hazard; or (c) determining whether the telematics data indicates a potential theft hazard created by a driver of the vehicle and, in response to determining that the telematics data indicates a potential theft hazard created by the driver, displaying via the user interface data indicating the potential theft hazard.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
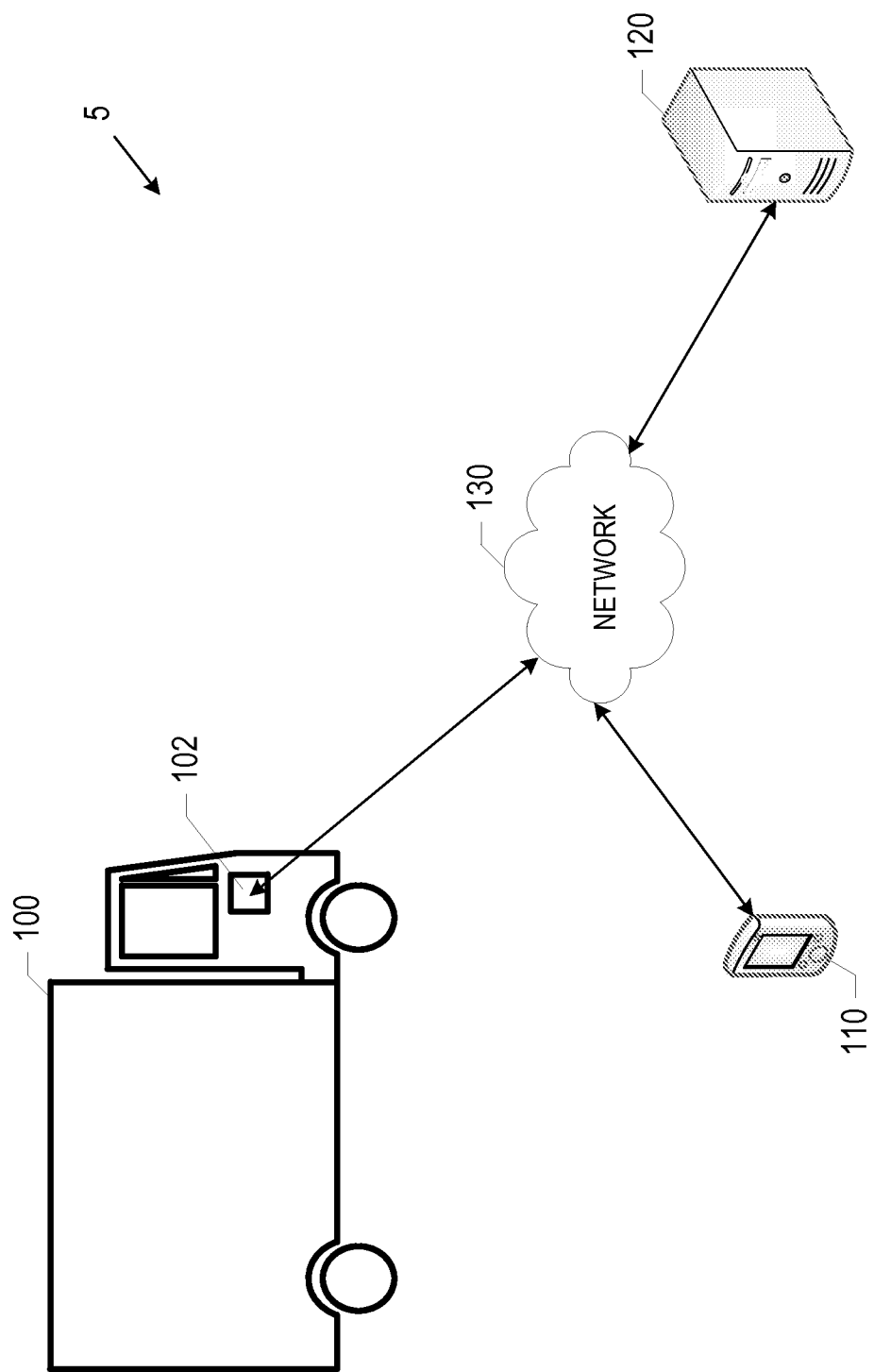
FIG. 1 is a block diagram of an exemplary fleet management system according to various embodiments.

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Overview

According to various embodiments of the present invention, a fleet management system is provided for capturing, storing, and analyzing telematics data to improve fleet management operations. The fleet management system may be used, for example, by a shipping entity (e.g., a common carrier, such as United Parcel Service, Inc., FedEx Corp., or the United States Postal Service) to capture telematics data from a plurality of vehicle sensors located on various delivery vehicles and to analyze the captured telematics data. In particular, various embodiments of the fleet management system are configured to analyze engine idle data in relation to other telematics data in order to identify inefficiencies, safety hazards, and theft hazards in a driver's delivery process. In addition, the fleet management system may be configured to assess various aspects of vehicle performance on specific shipping routes, such as vehicle travel delays and vehicle speeds. These analytical capabilities allow the fleet management system to assist shipping entities, other fleet managing entities, or other entities in analyzing driver performance, reducing fuel and maintenance costs, and improving route planning.

For example, an exemplary fleet management system includes various delivery vehicles having a variety of vehicle sensors. The vehicle sensors are configured to measure various conditions related to the vehicle (e.g., engine ignition, engine speed, vehicle speed, seat belt status, vehicle heading, and vehicle location). The sensors are controlled by a telematics device configured to capture and store telematics data (e.g., engine idle data) when certain defined vehicle events are detected.

Telematics data is captured by the fleet management system from the vehicles in the fleet as they execute various delivery routes. For the purposes of the fleet management system, each delivery route is comprised of a series of vehicle trips. A vehicle trip comprises starting the vehicle's engine, traveling some distance, and turning off the vehicle's engine. For example, when a driver starts a delivery vehicle to travel to a destination, a vehicle trip begins. When the driver reaches the destination and shuts off the engine while delivering the package, the vehicle trip ends. Thus, a full delivery route will often comprise a number of vehicle trips. Each vehicle trip may be further divided into a Start of Trip segment (e.g., the time period between vehicle's engine turning on and the vehicle beginning to travel to its destination), a During Travel segment (e.g., the period of time during which the vehicle travels to its destination with the vehicle's engine on), and an End of Trip segment (e.g., the period of time between the vehicle stopping at its destination and the vehicle's engine turning off).

To analyze the efficiency of a driver, the fleet management system is configured to examine the telematics data received from the vehicle operated by the driver and to identify periods of engine idle time having an abnormally long duration. The system then examines other telematics data captured near in time to each period of engine idle time to determine the cause of the excessive idle time. For example, the system may recognize that a driver unnecessarily allowed the vehicle's engine to idle while he or she fastened a seat belt by identifying abnormally long engine idle period in a Start of Trip vehicle segment and identifying telematics data near that engine idle period indicating that the driver's seat belt was engaged. The system may then alert a user (e.g., the driver, the driver's manager, or a central vehicle monitor) of this inefficiency. The driver may then be instructed (e.g., in person, or via an electronic message generated by the system), to fasten their seatbelt before starting the vehicle's engine. By instructing the driver to fasten his or her seat belt before starting the vehicle's engine, a shipping entity user reduces fuel consumption and engine running time for the vehicle.

The system may employ similar logic to identify other potential inefficiencies, safety hazards, and theft hazards. In addition, as will be described in more detail below, the fleet management system is also configured to calculate various travel statistics (e.g., engine idle time percentage, average vehicle speed, and average travel delays) and provide efficiency comparison tools (e.g., comparing driver efficiencies and travel delays for routes).

Identifying inefficiencies within a driver's routine and practices allows fleet operators to correct these inefficient practices and reduce the amount of idle time for deliveries. Indeed, the excess engine idle time associated with inefficient driver practices results in fuel being wasted and engine running time being increased. When aggregated over a large fleet of vehicles, these inefficiencies may amount to significant fuel and maintenance costs. In addition, the travel statistics and comparison tools provided by the fleet management system allow users to optimize shipping routes and logistical planning.

System Architecture

A fleet management system 5 according to one embodiment is shown in FIG. 1. In the illustrated embodiment, the fleet management system 5 includes one or more delivery vehicles 100, a portable data acquisition device 110, and a central server 120. The one or more delivery vehicles 100 each include a plurality of vehicle sensors (not shown) and a telematics device 102. The telematics device 102, portable data acquisition device 110, and central server 120 are connected to communicate with each other via a communications network 130 (e.g., the Internet, an Intranet, or other suitable network). In addition, the telematics device 102, portable data acquisition device 110, and central server 120 are configured for storing data to an accessible database (not shown) that may be stored on (or, alternatively, stored remotely from) the central server 120.

In the illustrated embodiment, the delivery vehicles 100 are responsible for the pickup and delivery of a plurality of packages within a particular delivery area. Each delivery vehicle 100 includes a plurality of vehicle sensors included within, or associated with, each delivery vehicle 100. As is discussed in more detail below, the vehicle sensors generate telematics data associated with engine ignition, engine speed, vehicle speed, vehicle location, the status of vehicle seat belts, doors, and handles, and/or other aspects of the vehicle, the vehicles' various components and/or the environment in which the vehicle is operating.

The telematics device 102 is included within, or otherwise associated with, each delivery vehicle 100 for the purpose of controlling the vehicle sensors, capturing and storing telematics data from the vehicle sensors, and/or associating the captured telematics data with contextual data. The telematics device 102 may include, for example, a processor and memory that can collect and capture and/or transmit data from vehicle sensors. For example, the telematics device 102 may be a computing device (e.g., a PC, server, desktop, or a handheld computing device), a programmable logic controller (PLC), an active RFID tag, or other suitable device. The analysis of the data collected by the telematics device 102 may be performed by software or algorithms executed by the processor of the telematics device or by a processor of a computing device that receives the data collected by the telematics device 102.

The telematics device 102 is further configured to transmit data over the network 130 to the portable data acquisition device 110 and/or the central server 120. As discussed in more detail below in regard to FIGS. 5-9, in response to receiving the telematics data from the telematics device 102 and/or the portable data acquisition device 110, as well as data received from other systems or devices operating in connection with the overall fleet management system 5, the central server 120 is configured to analyze the received telematics data and identify data indicating various inefficiencies, safety hazards, or security hazards present in the deliveries carried out by one or more drivers of the delivery vehicles 100.

In one embodiment, the telematics device 102 transmits some or all of the telematics data, via any suitable wired or wireless communication network 130, to a portable data acquisition device 110 (e.g., cellular telephone, personal digital assistant (PDA), laptop, etc.) operated by a driver associated with the delivery vehicle 100. The portable data acquisition device 110 may, in turn, transmit, via the same or different communication network 130, some or all of the received data to a central server 120, or similar network entity or mainframe computer system. In addition, according to one embodiment, the telematics device 102 may further transmit some or all of the telematics data directly to the central server 120, via the same or different communication network 130.

According to embodiments of the present invention, the communication network 130 may be capable of supporting communication in accordance with any one or more of a number of second-generation (2G), 2.5G and/or third-generation (3G) mobile communication protocols or the like. More particularly, network 130 may be capable of supporting communication in accordance with 2G wireless communication protocols IS-136 (TDMA), GSM, and IS-95 (CDMA). Also, for example, the network 130 may be capable of supporting communication in accordance with 2.5G wireless communication protocols GPRS, Enhanced Data GSM Environment (EDGE), or the like. In addition, for example, the network 130 can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, the telematics device 102 and portable data acquisition device 110 may be configured to communicate with one another in accordance with techniques such as, for example, radio frequency (RF), Bluetooth™, infrared (IrDA), or any of a number of different wireless networking techniques, including Wireless LAN (WLAN) techniques.

Although the telematics device 102, portable data acquisition device 110, and central server 120 are illustrated in FIG. 1 as communicating with one another over the same network 130, these devices may likewise communicate over separate networks. For example, while the telematics device 102 may communicate with the portable data acquisition device 110 over a wireless personal area network (WPAN) using, for example, Bluetooth techniques, the telematics device 102 and/or portable data acquisition device 110 may communicate with the central server 120 over a wireless wide area network (WWAN), for example, in accordance with EDGE, or some other 2.5G wireless communication protocol.

According to one embodiment, in addition to receiving telematics data from the telematics device 102, the portable data acquisition device 110 may be further configured to collect and transmit telematics data on its own. For example, according to one embodiment, the portable data acquisition device 110 may include a location determining device, such as a Global Positioning System (GPS) device, for providing location information in the form of, for example, latitude and longitude values. In particular embodiments, and as is discussed in more detail below, this location determining device may be used to gather information regarding the location of the driver him- or herself, as opposed to location information associated with the delivery vehicle 100, which may be collected (or determined) by the telematics device 102.

The portable data acquisition device 110 may be any device associated with a carrier (e.g., UPS, FedEx, United States Postal Service (USPS), etc.). In various embodiments, the portable data acquisition device 110 may be capable of receiving data via one or more input units or devices, such as a keypad, touchpad, barcode scanner, radio frequency identification (RFID) reader, interface card (e.g., modem, etc.) or receiver. The portable data acquisition device 110 may further be capable of storing data to one or more volatile or non-volatile memory modules, and outputting the data via one or more output units or devices, for example, by displaying data to the user operating the device 110, or by transmitting data, for example over the communication network 130. One type of portable data acquisition device 110, which may be used in conjunction with embodiments of the present invention is the Delivery Information Acquisition Device (DIAD) presently utilized by UPS.

Vehicle Sensors

According to various embodiments, the delivery vehicles 100 are equipped with a variety of vehicle sensors. In certain embodiments, the delivery vehicles 100 include various combinations of sensors configured to make measurements pertaining to the following aspects of the delivery vehicles: engine ignition (e.g., on or off), engine speed (e.g., RPM and idle time events), vehicle speed (e.g., miles per hour), seat belt status (e.g., engaged or disengaged), vehicle heading (e.g., degrees from center), vehicle backing (e.g., moving in reverse or not moving in reverse), vehicle doors (e.g., open or closed), vehicle handles (e.g., grasped or not grasped by a driver), vehicle location (e.g., latitude and longitude), distance traveled (e.g., miles between two points), use of portable data acquisition device (e.g., in use or not in use), throttle position, brake pedal position, parking brake position, and other measurements (e.g., engine oil pressure, engine temperature, or engine faults).

According to various embodiments, on/off sensors, which register a voltage amount that corresponds with an on/off condition of a sensor, may be disposed within the vehicles 100 for collecting data. For example, in one embodiment, a seat belt sensor may register 0V when the seat belt is disengaged and 12V when the seat belt is engaged. This is sufficient for the seat belt sensor in particular because the seat belt is either engaged or disengaged at all times. As another example, one or more door position sensors may be connected, for example, to the driver side, passenger side, and bulkhead doors, and may register 0V when the door with which the sensor is associated is in an open position, and 12V when the door is closed. As another example, an ignition sensor may register 0V when the vehicle 100 is turned off and 12V when the vehicle 100 is turned on. As yet another example, a backing light sensor may register 0V when the vehicles' backing lights are off and 12V when the vehicle's backing lights are on. As yet another example, the engine idle sensor may be configured to generate 0V when the engine speed is above idle and 12V when the engine is idling.

According to various embodiments, variable voltage sensors, which may be used to register variations in voltage, may also be disposed within the delivery vehicles 100 for collecting data. For example, the engine speed sensor may detect the speed of the engine in revolutions per minute (RPM) by registering a particular voltage that corresponds to a particular RPM reading. The voltage of the sensor may increase or decrease proportionally with increases or decreases in the engine RPM. As another example, oil pressure sensors may detect the vehicle's oil pressure by registering a particular voltage that corresponds to a particular oil pressure. Other examples of variable voltage sensors may include temperature sensors, vehicle speed sensors, vehicle heading sensors, and vehicle location sensors.

The exemplary vehicle sensors described above may be configured, for example, to operate in any fashion suitable to generate computer-readable data that may be captured and transmitted by the telematics device 102. In addition, while certain sensors are preferably disposed at particular locations on or within the vehicle (e.g., handle sensors at the vehicle handles), certain sensors may be disposed anywhere within the vehicle, such as within the telematics device itself (e.g., location sensor).

Telematics Device

Figure 2:
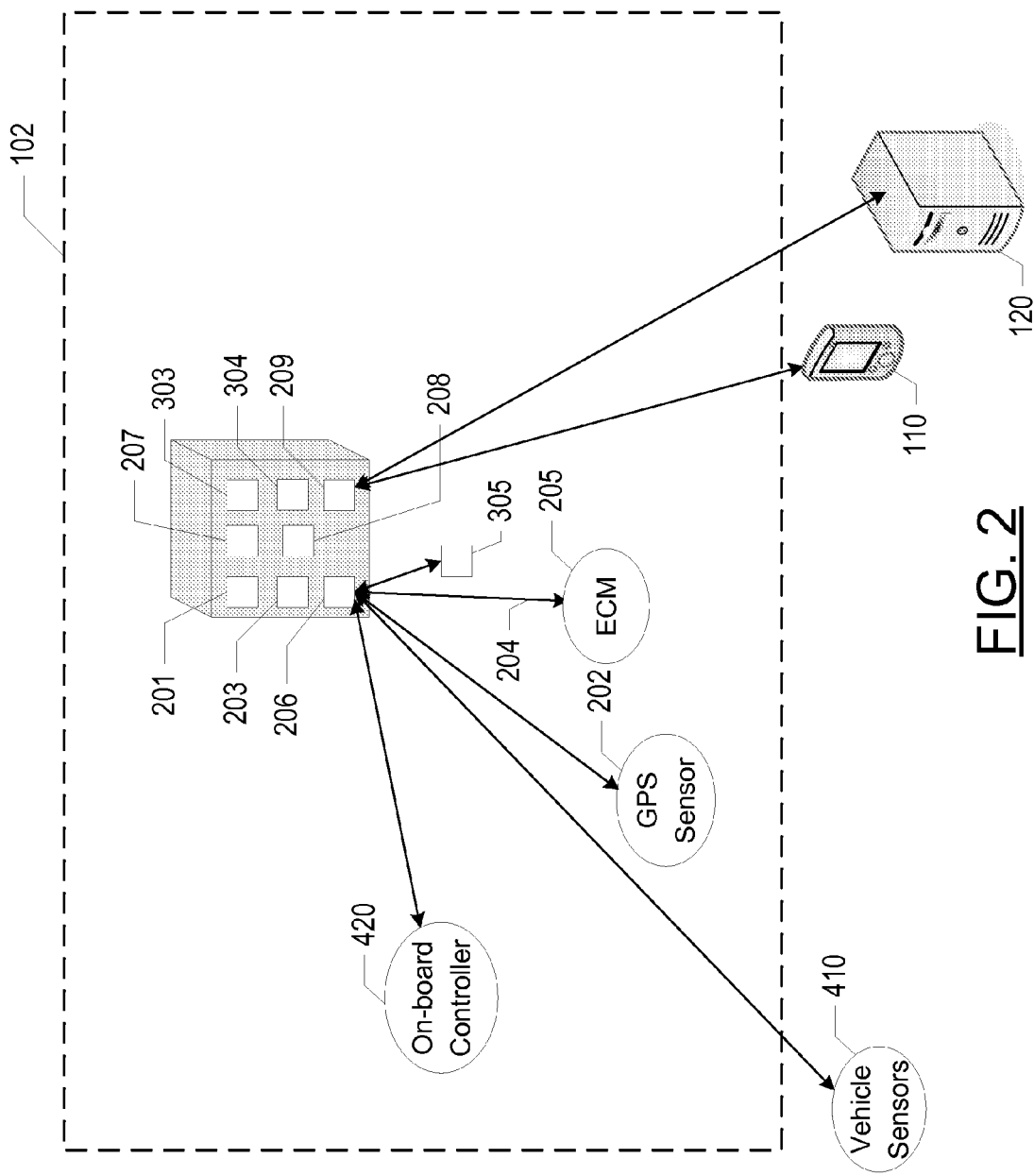
FIG. 2 is a block diagram of a telematics device according to various embodiments of the present invention.
Figure 3:
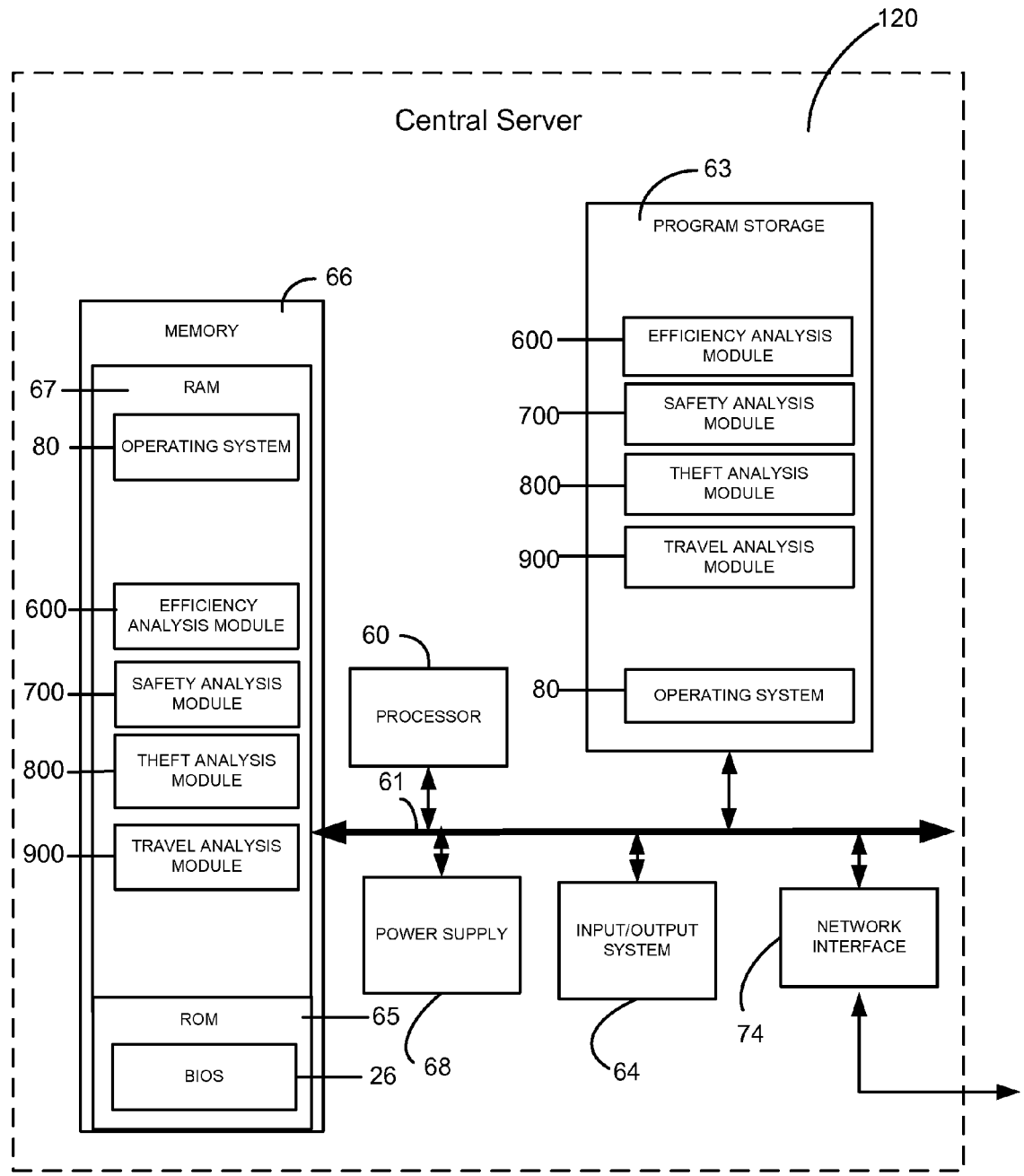
FIG. 3 is a schematic block diagram of a central server according to various embodiments.

FIG. 2 provides a more detailed block diagram of an exemplary telematics device 102 in accordance with an embodiment of the present invention. As noted above and explained in greater detail below, the telematics device 102 may be configured to control a variety of vehicle sensors, collect vehicle telematics data generated by the sensors, and transmit the telematics data to the portable data acquisition device 110 and/or central server 120 via one of several communication methods.

In the illustrated embodiment, the telematics device 102 includes the following components: a processor 201, a location-determining device or sensor 202 (e.g., GPS sensor), a real-time clock 203, J-Bus protocol architecture 204, an electronic control module (ECM) 205, a port 206 for receiving data from vehicle sensors 410 in one of the delivery vehicles 100, a communication port 207 for receiving instruction data, a radio frequency identification (RFID) tag 305, a power source 208, a data radio 209 for communication with a WWAN, a WLAN and/or a WPAN, FLASH, DRAM, and NVRAM memory modules 303, and a programmable logic controller (PLC) 304. In an alternative embodiment, the RFID tag 305, the location sensor 202, and the PLC 304 may be located in the delivery vehicle 100 external to the telematics device 102. In various embodiments, the telematics device may omit certain of the components described above. It should be understood that the telematics device may include any other suitable components. For example, the telematics device may include other types of communications components than those described above.

According to one embodiment, the processor 201 is configured to capture and store telematics data from one or more vehicle sensors 410 on a delivery vehicle 100 upon the occurrence of one or more defined vehicle events. As is described in greater detail below, the processor 201 is configured such that any parameter measurable by the one or more vehicle sensors 410 may be defined as a vehicle event. In addition, the processor 201 may be configured to capture and store data from any one of, or any combination of, the vehicle sensors 410 in response to detecting a defined vehicle event. The processor 201 is also configured to associate telematics data received from the vehicle sensors 410 with contextual data indicating, for example: (1) the time the data was captured (e.g., through time-stamping), (2) the vehicle the data was captured from, (3) the driver of the vehicle, (4) a log reason for capturing the data, and/or (5) the route the driver was on at the time the data was collected. In various embodiments, the processor 201 is further configured to transmit the telematics data to the portable data acquisition device 110 and/or the central server 120. In other embodiments, the processes described herein as being carried out by a single processor may be accomplished by multiple processors.

In one embodiment, the location sensor 202, which may be one of several components available in the telematics device 102, may be compatible with a low Earth orbit (LEO) satellite system or a Department of Defense (DOD) satellite system. Alternatively, triangulation may be used in connection with various cellular towers positioned at various locations throughout a geographic area in order to determine the location of the delivery vehicle 100 and/or its driver. The location sensor 202 may be used to receive position, time, and speed data. It will be appreciated by those skilled in the art that more than one location sensor 202 may be utilized, and that other similar techniques may likewise be used to collect geo-location information associated with the delivery vehicle 100 and/or its driver.

In one embodiment, the ECM 205 with J-Bus protocol 204 may be one of several components available in the telematics device 102. The ECM 205, which may be a scalable and subservient device to the telematics device 102, may have data processor capability to decode and store analog and digital inputs and ECM data streams from vehicle systems and sensors 410, 420. The ECM 205 may further have data processing capability to collect and present vehicle data to the J-Bus 204 (which may allow transmittal to the telematics device 102), and output standard vehicle diagnostic codes when received from a vehicle's J-Bus-compatible on-board controllers 420 or vehicle sensors 410.

In one embodiment, an instruction data receiving port 207 may be one of several components available in the telematics device 102. Embodiments of the instruction data receiving port 207 may include an Infrared Data Association (IrDA) communication port, a data radio, and/or a serial port. The instruction receiving data port 207 may receive instructions for the telematics device 102. These instructions may be specific to the vehicle 100 in which the telematics device 102 is installed, specific to the geographical area in which the vehicle 100 will be traveling, or specific to the function the vehicle 100 serves within the fleet.

In one embodiment, a radio frequency identification (RFID) tag 305 may be one of several components available for use with the telematics device 102. One embodiment of the RFID tag 305 may include an active RFID tag, which comprises at least one of the following: (1) an internal clock; (2) a memory; (3) a microprocessor; and (4) at least one input interface for connecting with sensors located in the vehicle 100 or the telematics device 102. Another embodiment of the RFID tag 305 may be a passive RFID tag. One or more RFID tags 305 may be internal to the telematics device 102, wired to the telematics device 102, and/or proximate to the telematics device 102. Each RFID tag 305 may communicate wirelessly with RFID interrogators within a certain geographical range of each other. RFID interrogators may be located external to the vehicle 100 and/or within the portable data acquisition device 110 that can be carried in and out of the vehicle 100 by the vehicle operator.

In one embodiment, the data radio 209 may be one of several components available in the telematics device 102. The data radio 209 may be configured to communicate with a WWAN, WLAN, or WPAN, or any combination thereof. In one embodiment, a WPAN data radio provides connectivity between the telematics device 102 and peripheral devices used in close proximity to the vehicle 100, such as the portable data acquisition device 110, a local computer, and/or a cellular telephone. As mentioned above, in one embodiment of the invention, a WPAN, such as, for example, a Bluetooth™ network (IEEE 802.15.1 standard compatible) may be used to transfer information between the telematics device 102 and the portable data acquisition device 110. In other embodiments, WPANs compatible with the IEEE 802 family of standards may be used. In one embodiment, the data radio 209 may be a Bluetooth™ serial port adapter that communicates wirelessly via WPAN to a Bluetooth™ chipset located in the portable data acquisition device 110, or other peripheral device. As discussed above with regard to FIG. 1, and as one of ordinary skill in the art will readily recognize, other wireless protocols exist (e.g., cellular technology) and can likewise be used in association with embodiments of the present invention.

As discussed above with regard to FIG. 1, in one embodiment, vehicle performance and tracking data collected by the telematics device 102 (i.e., telematics data) may be transmitted via a WPAN to, and stored by, the portable data acquisition device 110 until a communication link can be established between the portable data acquisition device 110 and the central server 120, or similar network entity or mainframe computer system. In one embodiment, the portable data acquisition device 110 may display telematics data for the driver's viewing, which may be helpful in troubleshooting vehicle performance problems and showing delivery route progress and instructions. In an alternative embodiment, the portable data acquisition device 110 may be a hand-held data acquisition device, like an iPAQ. The Media Access Control (MAC) address, which is a code unique to each Bluetooth™-enabled device that identifies the device, similar to an Internet protocol address identifying a computer in communication with the Internet, can be communicated to other devices in communication with the WPAN, which may assist in identifying and allowing communication among vehicles, cargo, and portable data acquisition devices equipped with Bluetooth™ devices.

Central Server

In various embodiments, the central server includes various means for performing one or more functions in accordance with embodiments of the present invention, including those more particularly shown and described herein. It should be understood, however, that the central server may include alternative devices for performing one or more like functions, without departing from the spirit and scope of the present invention.

Figure 5:
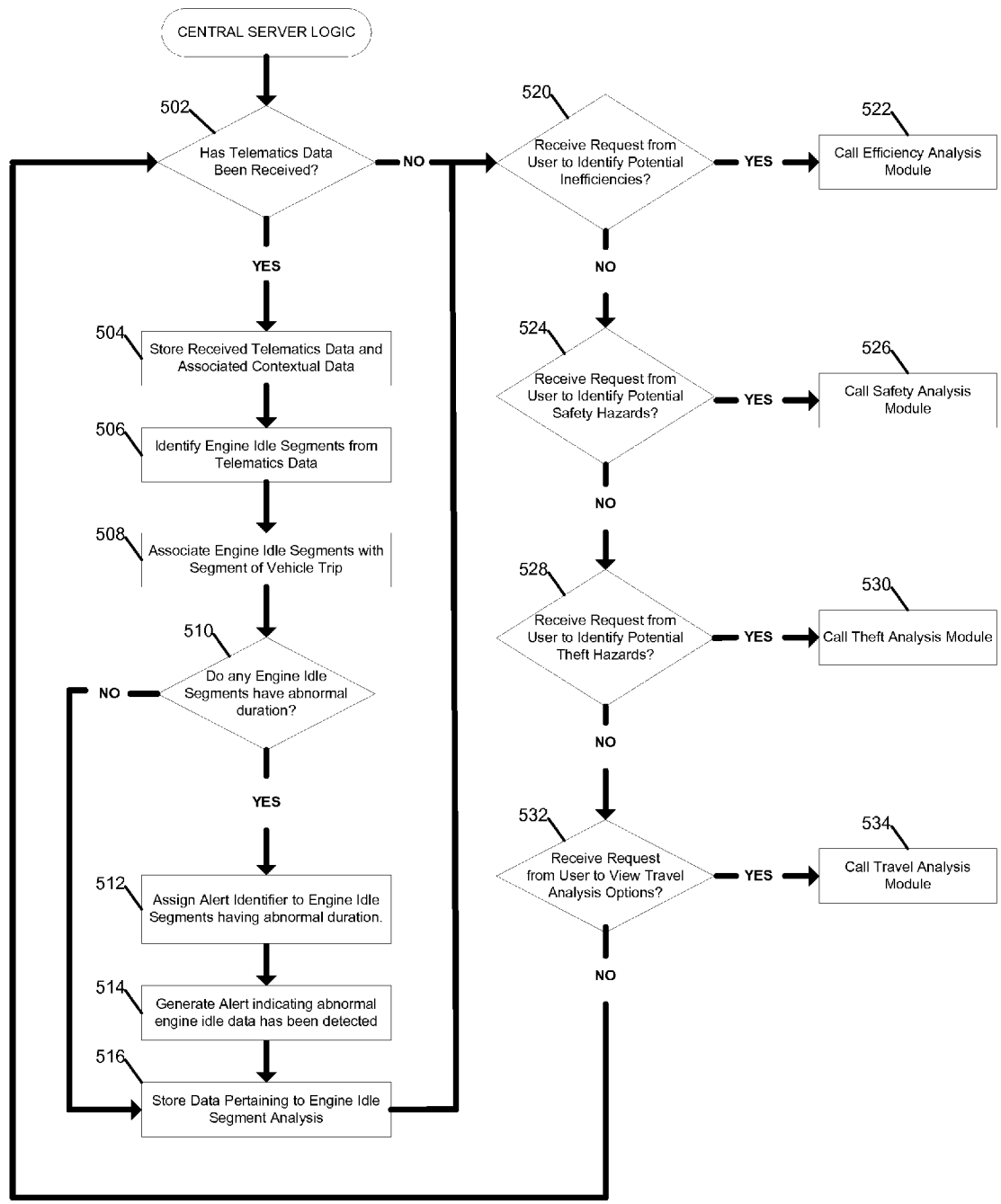
FIG. 5 is a flow diagram of steps executed by the central server according to one embodiment.

FIG. 5 is a schematic diagram of the central server 120 according to various embodiments. The central server 120 includes a processor 60 that communicates with other elements within the central server 120 via a system interface or bus 61. Also included in the central server 120 is a display device/input device 64 for receiving and displaying data. This display device/input device 64 may be, for example, a keyboard or pointing device that is used in combination with a monitor. The central server 120 further includes memory 66, which preferably includes both read only memory (ROM) 65 and random access memory (RAM) 67. The server's ROM 65 is used to store a basic input/output system 26 (BIOS), containing the basic routines that help to transfer information between elements within the central server 120.

In addition, the central server 120 includes at least one storage device 63, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide nonvolatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 65. Such program modules include an operating system 80, a efficiency analysis module 600, a safety analysis module 700, a theft analysis module 800, and a travel analysis module 900. According to various embodiments, the efficiency analysis module 500, safety analysis module 600, theft analysis module 700, and travel analysis module 900 control certain aspects of the operation of the central server 120 with the assistance of the processor 60 and operating system 80.

In general, the efficiency analysis module 600 is configured to analyze engine idle data in relation to other telematics data and in accordance with user preferences to (i) identify engine idle segments indicating potential inefficient operation of a delivery vehicle and (ii) identify specific inefficient operations indicated by the engine idle segments and associated telematics data. The safety analysis module 700 is configured to analyze engine idle data in relation to other telematics data and in accordance with user preferences to (i) identify engine idle segments indicating potential safety hazards present in the operation of a delivery vehicle and (ii) identify specific safety hazards indicated by the engine idle segments and associated telematics data. The theft analysis module 800 is configured to analyze engine idle data in relation to other telematics data and in accordance with user preferences to (i) identify engine idle segments indicating potential theft hazards present in the operation of a delivery vehicle and (ii) identify specific theft hazards indicated by the engine idle segments and associated telematics data. The travel analysis module 600 is configured to provide a user with various options for analyzing travel aspects of the delivery vehicles 100 in the fleet management system 5. Embodiments of these modules are described in more detail below in relation to FIGS. 6-9.

In a particular embodiment, these program modules 600, 700, 800, and 900, are executed by the central server 120 and are configured to generate graphical user interfaces accessible to users of the system. In one embodiment, the user interfaces may be accessible via the Internet or other communications network. In other embodiments, one or more of the modules 600, 700, 800, and 900 may be stored locally on one or more computers and executed by one or more processors of the computers. According to various embodiments, the modules 600, 700, 800, and 900 may send data to, receive data from, and utilize data contained in, a database, which may be comprised of one or more separate, linked databases.

Also located within the central server 120 is a network interface 74, for interfacing and communicating with other elements of a computer network. It will be appreciated by one of ordinary skill in the art that one or more of the central server 120 components may be located geographically remotely from other central server 120 components. Furthermore, one or more of the components may be combined, and additional components performing functions described herein may be included in the central server 120.

While the foregoing describes a single processor 60, as one of ordinary skill in the art will recognize, the central server 120 may comprise multiple processors operating in conjunction with one another to perform the functionality described herein. In addition to the memory 66, the processor 60 can also be connected to at least one interface or other means for displaying, transmitting and/or receiving data, content or the like. In this regard, the interface(s) can include at least one communication interface or other means for transmitting and/ or receiving data, content or the like, as well as at least one user interface that can include a display and/or a user input interface. The user input interface, in turn, can comprise any of a number of devices allowing the entity to receive data from a user, such as a keypad, a touch display, a joystick or other input device.

While reference is made to a central "server" 120, as one of ordinary skill in the art will recognize, embodiments of the present invention are not limited to a client-server architecture. The system of embodiments of the present invention is further not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), or similar electronic devices, collaborating with one another to provide the functionality described herein in association with the central server 120 may likewise be used without departing from the spirit and scope of embodiments of the present invention.

Telematics Device Configuration and Logic

As described above, in various embodiments, the telematics device is generally configured to control a variety of vehicle sensors, capture and store vehicle telematics data generated by the sensors, associate the collected telematics data with contextual data, and transmit the telematics data to the portable data acquisition device 110 and/or central server 120.

According to various embodiments, the processor 201 of the telematics device 102 is configured to capture and store telematics data from any one of, or any combination of, the vehicle sensors 410 in response to detecting a defined vehicle event. The processor 201 is configured such that any parameter measurable by the one or more vehicle sensors 410 may be defined as a vehicle event.

For example, in one embodiment, the processor 201 is configured such that vehicle events include (a) the engine of the vehicle 100 being turned on or off, (b) the engine of the vehicle 100 beginning to idle or ceasing to idle, and (c) a seat belt in the vehicle being engaged or disengaged. In this embodiment, the processor 201 is also configured to instantaneously capture data from certain vehicle sensors 410 upon the occurrence of any vehicle event. Accordingly, in one embodiment, the processor 201 will capture and store data from all vehicle sensors 410 any time one of the vehicle events (a), (b), or (c) is detected by any of the vehicle sensors 410.

In this embodiment, if the vehicle's engine is on and the vehicle speed becomes zero (e.g., the vehicle begins to idle), the telematics device 102 will capture and store data from a predetermined set of vehicle sensors 410 (e.g., the vehicle's engine speed sensor, speed sensor, seat belt status sensor, direction sensor, and location sensor). In addition, if the vehicle is idling, another vehicle event will be detected when the vehicle increases its speed above zero or the engine turns off. As a result, in this embodiment, vehicle events are detected and telematics data is captured and stored at the beginning and end of every period during which the vehicle's engine is idling. This ensures that the telematics device 102 captures every period of engine idling for each delivery vehicle.

According to various embodiments, the processor 201 may also be configured to define vehicle events through the varying parameters measured by certain vehicle sensors 410. For example, in one embodiment, the processor 201 is configured such that a vehicle event is detected anytime the vehicle's heading is greater than a predetermined number of degrees (e.g., about 5 degrees) from center to the left or right (e.g., the driver turns the steering wheel such that the vehicle is heading 10 degrees to the right). However, in another embodiment, the processor 201 is configured such that a vehicle event is also detected when the vehicle turns 10 degrees or more. This principle may be applied to other vehicle sensors capable of measuring variable parameters (e.g., RPM as measured by an engine speed sensor or miles per hour as measured by a vehicle speed sensor).

According to various embodiments, the processor 201 may be configured to capture and store telematics data from any one of, or any combination of, the vehicle sensors 410 in response to detecting a defined vehicle event. As described above, in one embodiment, the processor 201 is configured to capture and store telematics data from a predefined group of vehicle sensors 410 when a vehicle event is detected. For example, in one embodiment, the processor 201 is configured to capture and store data from only the seat belt sensor, engine speed sensor, and location sensor upon the occurrence of any specified vehicle event.

In other embodiments, the processor 201 may be configured to capture and store telematics data from certain vehicle sensors upon the occurrence of certain vehicle events. For example, in one embodiment, the processor 201 is configured such that (a) the seat belt being engaged or disengaged and (b) the vehicle moving in reverse are vehicle events. In this embodiment, the processor 201 is further configured to capture and store data from the seat belt sensor, engine speed sensor, and location sensor upon the occurrence of vehicle event (a) (i.e., the seat belt being engaged or disengaged), and to capture and store data from the vehicle speed sensor and location sensor upon the occurrence of vehicle event (b) (i.e., the vehicle moving in reverse).

The processor 201 may also be configured to capture and store telematics data from different vehicle sensors 410 upon the detection of certain values for vehicle events having varying parameters. For example, in one embodiment, the processor 201 is configured to capture and store telematics data from certain vehicle sensors when (a) the vehicle turns 5 degrees or more, while data will be captured from additional vehicle sensors when (b) the vehicle turns 10 degrees or more. This principle may be applied to other vehicle sensors capable of measuring variable parameters (e.g., RPM as measured by an engine speed sensor or miles per hour as measured by a vehicle speed sensor).

In further embodiments, the processor 201 may be configured to capture and store telematics data from certain vehicle sensors at certain time intervals if no vehicle events occur for a certain period of time. For example, in one embodiment, the processor 201 is configured such that, if no vehicle events are detected for 200 seconds, it will capture and store telematics data from certain (or all) vehicle sensors. In this embodiment, no more than 200 seconds of time will pass at any given point without data being collected from the vehicle sensors.

As described above, according to various embodiments, the processor 201 is also configured to associate telematics data received from the vehicle sensors 410 with contextual data including, but not limited to, data indicating the time the telematics data was captured (e.g., time-stamping), the vehicle the data was captured from, the driver of the vehicle, the route the driver was on at the time the data was collected, a log reason the data was captured, and/or the sensor the data was collected from. By associating and storing (e.g., in a database) the telematics data received from various vehicle sensors with this contextual data, the telematics device 102, central server 120, or other components of the fleet management system are able to search and identify stored telematics data for a particular date, time, vehicle, driver, sensed aspect of a vehicle, and/or route.

According to various embodiments, the defined vehicle events that trigger the telematics device to capture and store telematics data, the sensors from which telematics data are captured and stored in response to detected vehicle events, and the intervals defined for capturing and storing data when no vehicle events are detected each impact the effectiveness with which the fleet management system 5 identifies potential inefficiencies, safety hazards, and theft hazards present in a driver's routine and further analyzes the telematics data. For example, capturing data for a large amount of vehicle sensors at a high frequency may allow the fleet management system 5 to analyze the telematics data with greater accuracy. This could be accomplished, for example, by a fleet management system with many defined vehicle events and short intervals for capturing data if no vehicle events are detected.

However, as particular embodiments of the fleet management system 5 will have more limited storage space available to store telematics data, the amount of telematics data collected may be regulated. Accordingly, the telematics device 102 may be flexibly configured to suit the needs of a particular user. For example, a fleet management entity with limited data storage resources that is particularly interested in monitoring seat belt usage in a fleet of vehicles may configure the telematics devices of those vehicles to capture and store data from only those sensors relevant to seat belt status and capture data at the minimal frequency necessary to accurately report seat belt usage. This embodiment uses a small number of vehicle events and long time interval for capturing telematics data when no vehicle events are detected. As a contrasting example, a large fleet management entity with large amounts of data storage resources may configure the telematics devices of its large fleet of vehicles to capture and store data from a wide variety of vehicle sensors at a high frequency such that the telematics data may be analyzed to assess a wide variety of vehicle and driver efficiencies. As described above, this embodiment uses a large number of vehicle events and short time interval for capturing telematics data when no vehicle event is detected.

Figure 4:
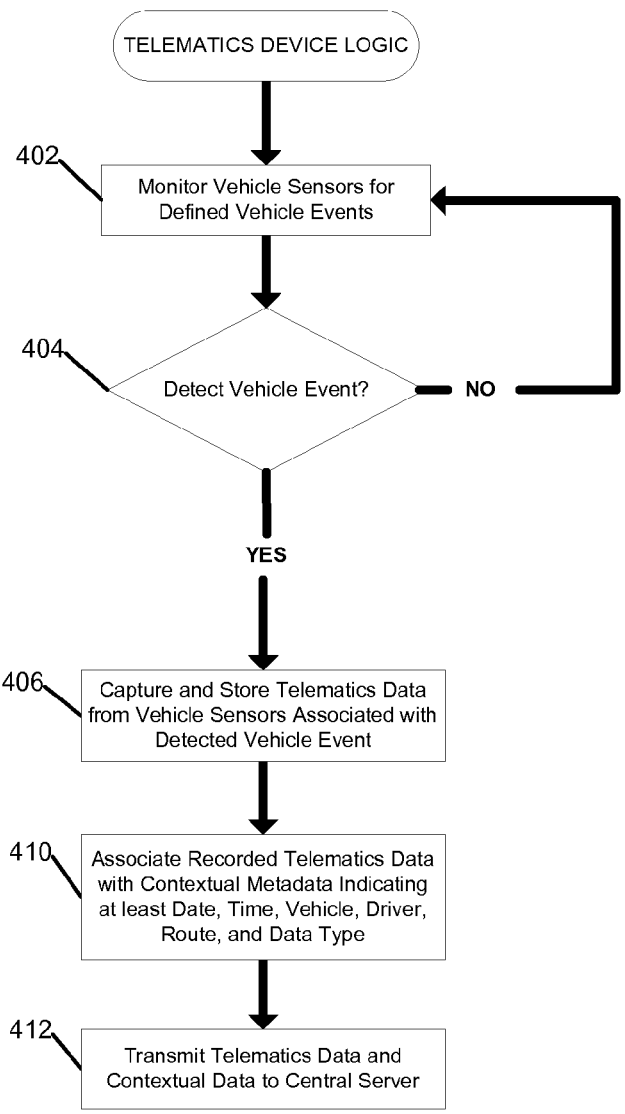
FIG. 4 is a flow diagram of steps executed by the telematics device according to one embodiment.

FIG. 4 illustrates exemplary steps executed by the telematics device 102 in controlling vehicle sensors, capturing and storing telematics data generated by the vehicle sensors, associating the collected telematics data with contextual information, and transmitting the telematics data to the portable data acquisition device 110 and/or central server 120. In the illustrated embodiment, the telematics device 102 has been configured to capture and store telematics data from certain sensors when the defined vehicle events with which they are associated are detected.

Beginning with step 402, the telematics device 102 continuously monitors readings from various vehicle sensors for parameters that match defined vehicle events. For example, in one embodiment, the telematics device 102 may monitor, among other sensors, the engine speed sensor and vehicle speed sensor to determine whether the vehicle's engine is idling. Next, at step 404, the telematics device 102 determines whether any of the defined vehicle events have occurred. If a vehicle event is not detected, the telematics device 102 moves back to step 402 and continues monitoring the vehicle sensors. If a vehicle event is detected, the telematics device 102 proceeds to step 406.

Next, at step 406, the telematics device 102 captures and stores data from the vehicle sensors associated with the vehicle event or vehicle events detected in step 404. For example, in one embodiment, the telematics device 102 is configured to capture the sensed telematics data at the instant a vehicle event is detected. In addition, according to one embodiment, the captured telematics data may be stored in the memory modules 303 of the telematics device 102 or in an associated database.

Next, at step 410, the telematics device 102 associates the telematics data captured and stored in step 406 with contextual data. In one embodiment, the contextual data indicates the date, time, vehicle, driver, route, and data type (e.g., the sensor that collected the data) for each captured piece of telematics data. For example, in step 406 the telematics device may capture the vehicle's engine speed in response to a vehicle event. The telematics data received from the vehicle sensor may be "1000 RPM," indicating that the engine was turning at 1000 revolutions per minute when the telematics data was captured. In response, the telematics device 102 may associate the following exemplary contextual data: Date=/ Aug. 24, 2009; Time=12:36 PM; Vehicle=GA12345; Driver=Doe, John A.; Route=#61256; Data Type=Engine Speed. According to various embodiments, the contextual data may be any computer-readable and transmittable data format. For example, in one embodiment, the contextual data is metadata.

Next, at step 412, the telematics device 102 transmits the stored telematics data and associated contextual data to the central server 120. This may be accomplished by using any of the transmission methods and systems described herein. In another embodiment, the telematics device 102 is configured to transmit the telematics data and contextual data to the portable data acquisition device 110, rather than or in addition to, transmitting the data to the central server 120.

Central Server Logic

FIG. 5 illustrates exemplary steps executed by the central server 120 to analyze telematics data captured and stored by the telematics device 102, identify data indicating potential inefficiencies, safety hazards, and/or theft hazards, and provide a variety of travel analysis options for fleet managing entities. Beginning with step 502, the central server 502 monitors whether telematics data has been received from the telematics device 102 or portable data acquisition device 110. If telematics data is not being received from either device, the central server 120 moves to step 520. If the central server 120 determines that telematics data is being received from either device, the central server 120 moves to step 504. Next, at step 504, the central server 120 stores, in the system's memory, the telematics data and any associated contextual data received from the telematics device 102 or portable data acquisition device 110.

Next, at step 506, the central server 120 identifies any engine idle segments indicated by the received telematics data. The telematics data may contain data indicating engine idle events (e.g., telematics data indicating that a delivery vehicle's engine was on and the vehicle's speed was zero at a particular point in time). In the illustrated embodiment, the central server 120 is configured to identify strings of consecutive engine idle events comprising engine idle segments (which are described in more detail below).

Telematics data captured in response to a variety of vehicle events may indicate an engine idle event. For example, in one embodiment, the telematics device may be configured such that defined vehicle events include (a) a vehicle's engine beginning to idle, (b) a vehicle's engine ceasing to idle, and (c) a seat belt being fastened, and telematics data from an engine speed sensor and a seat belt sensor will be captured upon the occurrence of either event. In this embodiment, if a vehicle's engine begins to idle, a vehicle event will be detected and telematics data will be captured. The captured telematics data will indicate an engine idle event as the engine was idling the moment the data was captured. In addition, if a driver fastens a seat belt, another vehicle event will be detected and telematics data will again be captured. If the vehicle's engine was still idling, the captured telematics will indicate an additional engine idle event as the engine was idling when the telematics data was captured.

An engine idle segment represents a period of time during which a vehicle was idling, beginning when the vehicle starts to idle and ending when the vehicle stops idling. For example, in the embodiment described immediately above, if a vehicle traveling at speed encounters traffic and has to slow to a stop, a vehicle event will be detected the moment the vehicle's speed reaches zero while the vehicle's engine is running. When this vehicle event is detected, telematics data is captured and stored from the associated vehicle sensors. The telematics data captured in this instance will indicate an engine idle event. While the vehicle is idling in traffic, other vehicle events may be detected (e.g., the driver unfastens the seat belt) and additional telematics data may be captured. As described above, this telematics data will also indicate an engine idle event or events. As the vehicle accelerates, another vehicle event is detected when the vehicle's speed increases above zero and additional telematics data is captured and stored. The telematics data captured in this instance will also indicate an engine idle event. The string of engine idle events (e.g., the engine idle event indicated from the data captured when the vehicle began to idle, engine idle events indicated from the data captured while the vehicle remained idling, and the engine idle event indicated from the data captured when the vehicle ceased to idle) form an engine idle segment representing the period of time during which the vehicle was stopped in traffic and its engine was idling. By identifying each engine idle segment, the central server 120 determines the specific periods of time during which a vehicle's engine was idling.

Next, at step 508, the central server 120 associates the identified engine idle segments with a particular segment of a vehicle trip. This is accomplished by comparing the engine idle segments to telematics data indicating various vehicle events occurring before and after each engine idle segment.

Figure 10:
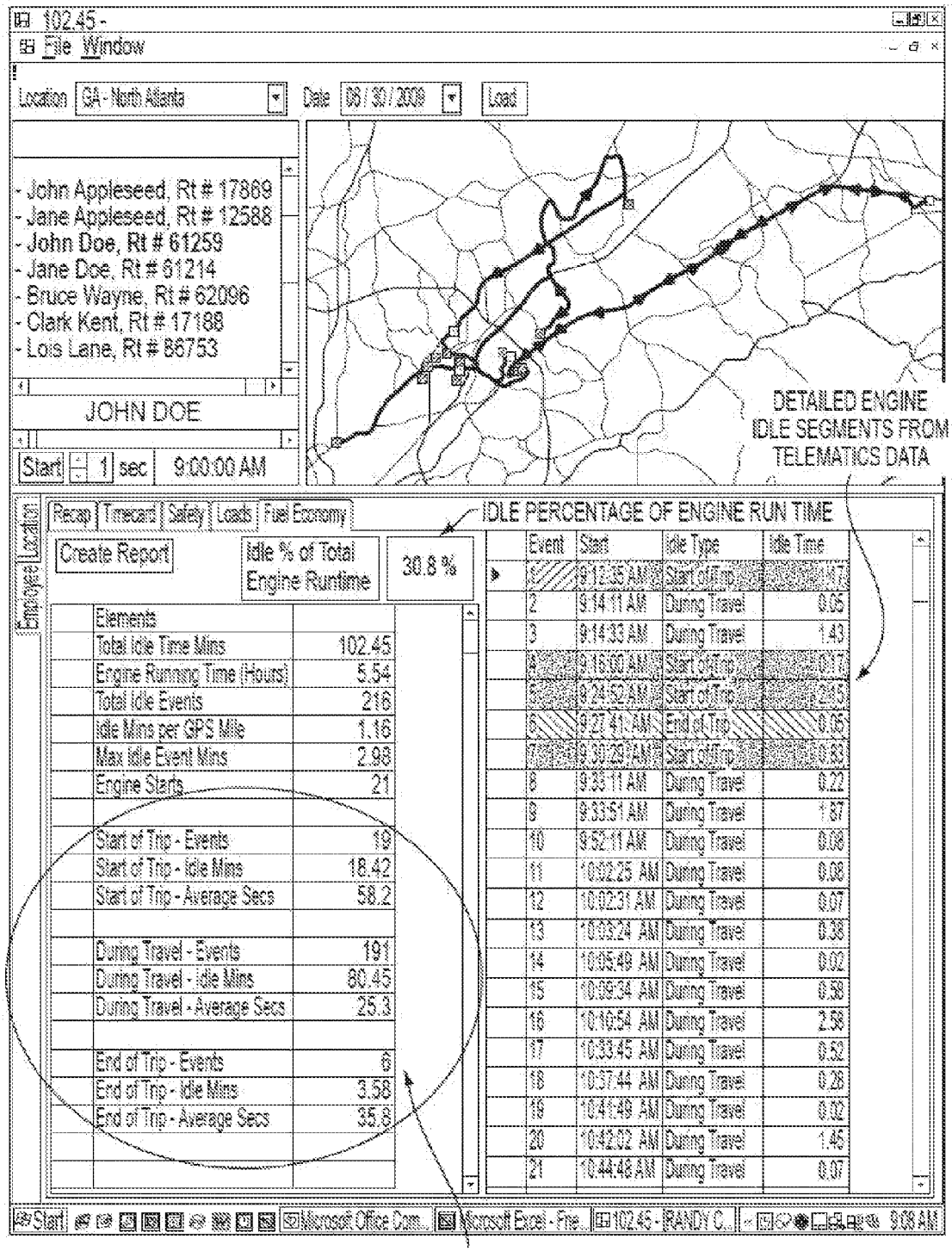
FIG. 10 is an exemplary user interface according to one embodiment.

As described above, in one embodiment, a vehicle trip may be divided into a Start of Trip segment, a During Travel segment, and an End of Trip segment. In one embodiment, the central server 120 associates each identified engine idle segment with a vehicle trip segment according to the following logic: (i) engine idle segments preceded by an engine off event (e.g., the engine simply being off) and followed by a travel event (e.g., the engine turned on and the vehicle moving) or another engine off event are associated with the Start of Trip Segment; (ii) engine idle segments preceded by a travel event and followed by another travel event are associated with the During Travel Segment; and (iii) engine idle segments preceded a travel event and followed by an engine off event are associated with the End of Trip Segment. As will be discussed in more detail below, FIG. 10 shows an exemplary user interface configured to display, among other things, a table of engine idle segments indicating the vehicle trip segment in which each engine idle segment occurred.

Next, at step 510, the central server 120 determines whether any of the identified engine idle segments have a statistically abnormal duration. In one embodiment, this determination is made by determining whether the duration of each engine idle segment exceeds an idle duration threshold for the vehicle trip segment with which the engine idle segment is associated. For example, a user of the fleet management system 5 may define an idle duration threshold for each vehicle trip segment. The target idle duration for Start of Trip events may be slightly longer than the target duration for End of Trip events due to the additional safety procedures a driver may go through after starting the engine, but before moving the vehicle (e.g., looking left, right, and in the mirrors to ensure it is safe to enter traffic).

A user of the fleet management system 5 may also specify parameters controlling which engine idle segments are identified by the central server 120 as having an abnormal duration. For example, in one embodiment, the user may specify that the central server 120 will identify all engine idle segments having a duration more than 5 seconds longer than their associated target idle duration. In another embodiment, where a user wants to identify only large idle periods, the user may specify that the central server 120 will identify all engine idle segments having a duration more than 20 seconds longer than their associated target idle duration. Accordingly, in one embodiment, at step 510, the central server 120 compares the duration of each engine idle segment to its relevant target duration and identifies all engine idle segments having a duration exceeding their target duration by an amount greater than or equal to a defined threshold value (e.g., a value specified by the user as described above).

If the central server 120 does not identify any engine idle segments having an abnormal duration, the central server 120 moves to step 516. If the central server 120 does identify one or more engine idle segments having an abnormal duration, the central server 120 moves to step 512. At step 512, the central server 120 assigns an alert identifier to the engine idle segments identified as having abnormal durations. For example, in one embodiment, the assigned alert identifiers are metadata identifying particular engine idle segments as having abnormal duration.

Next, at step 514, the central server generates an alert indicating to a user of the fleet management system 5 that engine idle data indicating at least one idle time of an abnormally long duration has been detected. For example, in one embodiment, the central server 120 sends an email to the fleet management system user indicating that engine idle data having an abnormal duration has been detected. In a further embodiment, the email may display the particular data having an abnormal duration or provide a link to the data. In yet another embodiment, the central server 120 may generate an alert via a user interface (e.g., the user interface shown in FIG. 10) indicating the identified engine idle segments. Next, at step 516, the central server 120 stores, in the system's memory, all of the data generated by the central server 120 in steps 506 through 514 (e.g., vehicle segment determinations, alert identifiers).

Steps 520 through 534 show an exemplary set of logic used by the central server to call various modules configured to conduct more detailed analyses of the telematics data received and processed in steps 506 through 514. As described above, according to certain embodiments, the fleet management system 5 may include a user interface through which a user of the system 5 may interact with the system and make choices. For example, the user interface may provide the user with options to (i) view potential inefficiencies indicated by the telematics data, (ii) view potential safety hazards indicated by the telematics data, (iii) view potential theft hazards indicated by the telematics data, and (iv) view more travel analysis options.

At step 520, the central server 120 determines whether a user of the fleet management system 5 has requested that the system 5 identify potential inefficiencies in a driver's delivery process indicated by the telematics data. If the user has requested this option, the central server 120 moves to step 522, where it calls the Efficiency analysis module 600. If the user has not requested this option, the central server 120 moves to step 524.

At step 524, the central server 120 determines whether a user of the fleet management system 5 has requested that the system 5 identify potential safety hazards in a driver's delivery process indicated by the telematics data. If the user has requested this option, the central server 120 moves to step 526, where it calls the Safety analysis module 700. If the user has not requested this option, the central server 120 moves to step 528.

At step 528, the central server 120 determines whether a user of the fleet management system 5 has requested that the system 5 identify potential theft hazards in a driver's delivery process indicated by the telematics data. If the user has requested this option, the central server 120 moves to step 530, where it calls the Theft analysis module 800. If the user has not requested this option, the central server 120 moves to step 532.

At step 528, the central server 120 determines whether a user of the fleet management system 5 has requested to view additional travel analysis options (e.g., calculating engine idle time percentages and calculating travel delays). If the user has requested this option, the central server 120 moves to step 534, where it calls the Travel analysis module 800. If the user has not requested this option, the central server 120 loops back to step 502.

In other embodiments, the central server may be configured not to execute steps 520, 524, 528, and 532. For example, in one embodiment, the central server is configured to automatically execute steps 522, 526, 530 and 534. In addition, according to other embodiments, the central server 120 may be configured to execute all or a portion of the steps illustrated in FIG. 5 in the same or a different order.

Efficiency Analysis Module

According to various embodiments, the efficiency analysis module 600 is configured to analyze engine idle data in relation to other telematics data and in accordance with user preferences to (i) identify engine idle segments indicating potential inefficient operation of a delivery vehicle and (ii) identify specific inefficient operations indicated by the engine idle segments and associated telematics data.

Figure 6:
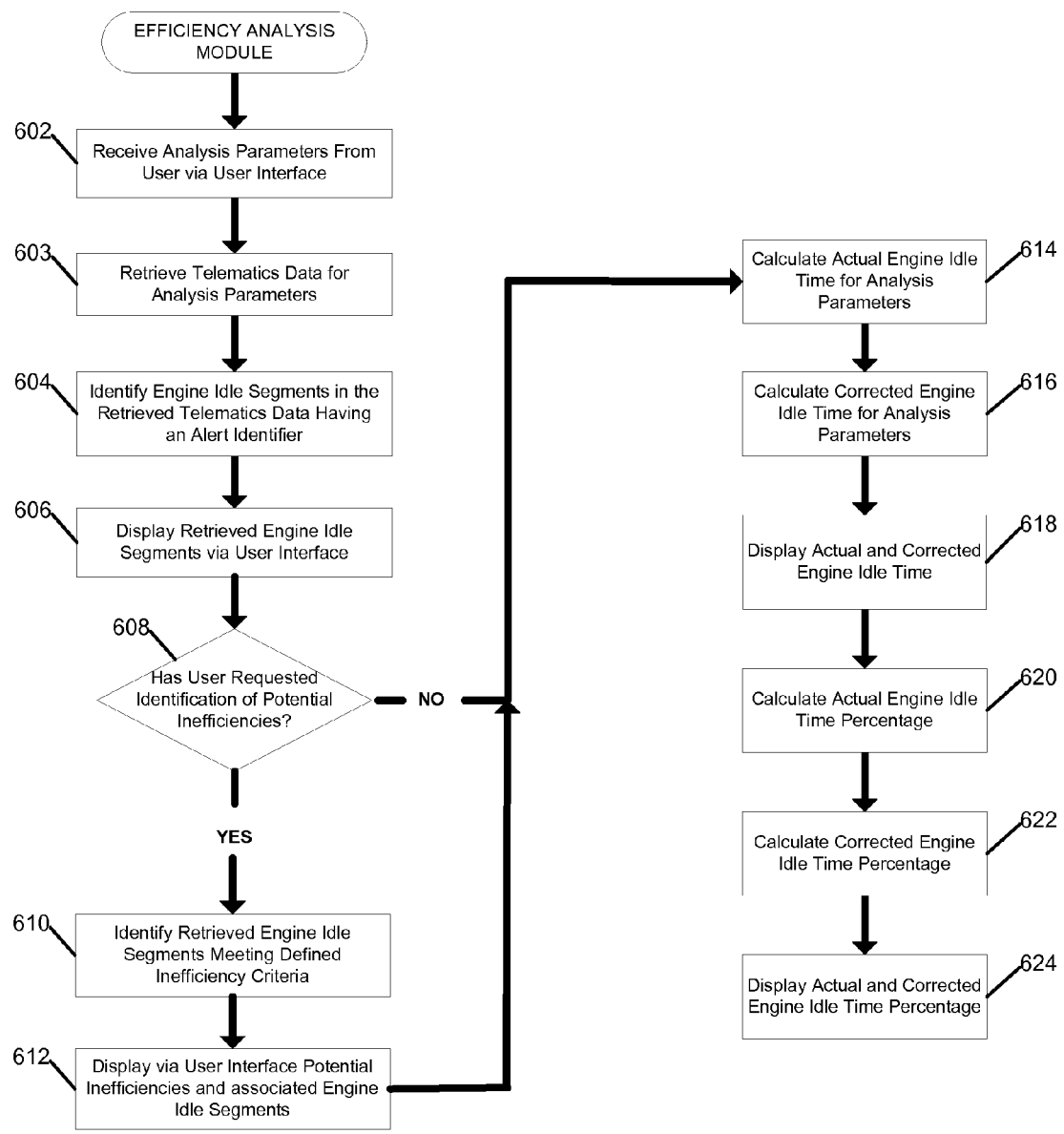
FIG. 6 is a flow diagram of steps executed by the efficiency analysis module shown in FIG. 3 according to one embodiment.

FIG. 6 illustrates exemplary steps executed by the efficiency analysis module 600 according to one embodiment. Beginning with step 602, the efficiency analysis module 600 receives user preferences for an efficiency analysis in the form of analysis parameters. For example, in one embodiment, a user may specify one or more of the following parameters in order to narrow the telematics data analyzed by the efficiency analysis module 600: (1) date; (2) time; (3) vehicle (e.g., a vehicle number); (4) driver (e.g., name or employee id); (5) route (e.g., route number); (6) vehicle trip segment (e.g., Start of Trip); and (7) vehicle event (e.g., seat belt engaged or disengaged). For each parameter, the user may specify a particular value (e.g., a date), range of values (e.g., range of dates), or series of values (e.g., two or more non-consecutive dates) defining the telematics data to be used by efficiency analysis module 600. Parameters without a specified value or values are ignored by the efficiency analysis module 600.

Next, at step 603, the efficiency analysis module 600 retrieves telematics data stored by the central server 120 meeting the analysis parameters received in step 602. This may be accomplished by using the analysis parameters as a filter for retrieving the telematics data. For example, if a user specifies a particular date, route number, and vehicle trip segment, the efficiency analysis module 600 will retrieve all telematics data captured on the specified date, for vehicles traveling along the specified route, and during the specified vehicle trip segment. In one embodiment, the desired telematics data is identified by using the contextual metadata associated with the stored telematics data by the telematics device 102 (see FIG. 4, step 410).

Next, at step 604, the efficiency analysis module 600 identifies all engine idle segments present in the retrieved telematics data having an alert identifier assigned by the central server 120 (see FIG. 5, step 512). As described above, in one embodiment, engine idle segments having been determined to have an abnormal duration are assigned an alert identifier by the central server 120.

Next, at step 606, the efficiency analysis module 600 displays the identified abnormal engine idle segments via a user interface. This allows the user to view all engine idle segments having an abnormal idle duration that meet the initial analysis parameters. According to one embodiment, these idle segments may be displayed in a table, similar to that illustrated in FIG. 10, showing the date and time each idle segment was captured, the vehicle trip segment during which each engine idle segment occurred, and the duration of each engine idle segment. In a further embodiment, the table may be configured such that the user may select a particular engine idle segment (e.g., with a computer mouse) and view the telematics data collected proximately before, proximately after, or during the particular engine idle segment. In this embodiment, the user has the option of browsing the telematics data captured during or proximate to the engine idle segment to determine the source of any potential inefficiencies.

Next, at step 608, the efficiency analysis module 600 determines whether the user has requested the central server 120 to identify potential inefficiencies indicated by the identified engine idle segments and retrieved telematics data (e.g., by selecting this option with a computer mouse via a user interface). If the user has not made this request, the efficiency analysis module 600 moves to step 614. If the user has made this request, the efficiency analysis module 600 moves to step 610.

Next, at step 610, the efficiency analysis module 600 identifies the retrieved engine idle segments meeting one or more sets of defined inefficiency criteria. According to one embodiment, the inefficiency criteria are programmable criteria for identifying specific potential inefficiencies in a delivery process. For example, a common inefficient operation in a delivery process occurs when a driver starts a delivery vehicle and allows the vehicle to idle while he or she fastens the vehicle's driver's side seat belt. By not fastening the seat belt before starting the vehicle's engine, the driver allows the vehicle to unnecessarily idle for a short period of time, wasting fuel and unnecessarily increasing the wear on the vehicle's engine. To identify the occurrence of this particular inefficient operation from the engine idle segments and telematics data, inefficiency criteria may be defined and associated with the inefficient operation.

For example, in one embodiment, inefficiency criteria associated with the operation of allowing the vehicle to idle while securing a seat belt is defined as any engine idle segment occurring in the start of trip segment where the telematics data indicates a seat belt was secured during the engine idle segment. In this embodiment, to determine whether any engine idle segments meet this inefficiency criteria, the efficiency analysis module 600 first identifies, from the set of previously identified engine idle segments meeting the analysis parameters, the engine idle segments occurring in the start of trip segment. For each of these start of trip engine idle segments, the efficiency analysis module 600 determines the duration of the engine idle segment and the time the engine idle segment began (or ended). Using the duration and start or end time as a guide, the efficiency analysis module 600 then searches the telematics data collected and stored during each engine idle segment for data indicating a seat belt was engaged. If the telematics data indicates a seat belt was engaged during a particular engine idle segment, the efficiency analysis module 600 determines that this particular inefficient operation (i.e., allowing the vehicle to idle while securing a seat belt) occurred for the vehicle, driver, and route associated with the particular engine idle segment.

According to various embodiments, the efficiency analysis module 600 may be configured to identify additional or different inefficient operations based on defined inefficiency criteria for each inefficient operation. Exemplary inefficient operations identifiable by the efficiency analysis module 600 include but are not limited to: (1) allowing a vehicle to idle while disengaging a seat belt; (2) allowing the vehicle to idle while opening or closing the bulkhead door (or other door) of the vehicle; and (3) allowing the vehicle to idle while using a portable data acquisition device (e.g., a DIAD). Inefficiency criteria may be defined and identified for these and other inefficient operations by the efficiency analysis module 600 in a manner similar to that described above.

Next, at step 612, the efficiency analysis module 600 displays information via a user interface indicating the specific inefficient operations determined to have occurred in step 610. In one embodiment, step 612 may also include displaying or providing a link to the specific telematics data indicating an identified inefficient operation.

Next, at step 614, the efficiency analysis module 600 calculates the actual engine idle time for the analysis parameters. For example, if a user specifies a particular date and vehicle in the analysis parameters, the efficiency analysis module 600 will calculate the actual engine idle time for the specified vehicle on the specified date. In one embodiment, the actual engine idle time represents the total amount of time a vehicle's (or vehicles') engine was idling for a period specified by the analysis parameters. In the example above, the actual engine idle time would represent the total amount of time the specified vehicle's engine was idling for the entire specified day.

According to one embodiment, the efficiency analysis module 600 is configured to determine the actual engine idle time for a set of analysis parameters by first identifying the engine idle segments meeting the analysis parameters and then calculating the total combined duration of all identified engine idle segments. This may be accomplished, for example, by retrieving all of the engine idle segments present in the telematics data retrieved in step 603 (e.g., the engine idle segments meeting the analysis parameters), adding the durations of all engine idle segments, and returning the calculated value.

For the purposes of evaluating the efficiency of operations, however, the actual engine idle time for a set of analysis parameters may in some instances be misleading. For example, certain significant amounts of engine idle time may be attributable to events which are not the result of a driver's inefficiency, such as travel delays. Accordingly, to better identify the engine idle time associated with driver inefficiencies, the efficiency analysis module 600 is further configured at step 616 to calculate the corrected engine idle time for the analysis parameters. In one embodiment, the corrected engine idle time represents the actual engine idle time less any engine idle time attributable to travel delays.

According to one embodiment, the efficiency analysis module 600 is configured to determine the corrected engine idle time by first identifying, from the engine idle segments used to calculate the actual engine idle time, those engine idle segments caused by travel delays. For example, in one embodiment, the efficiency analysis module 600 may accomplish this by identifying the engine idle segments associated with during travel vehicle trip segments. Next, the efficiency analysis module 600 examines the telematics data captured during those engine idle segments and searches for data indicating non-travel related delays. For example, in one embodiment, the efficiency analysis module 600 is configured such that if the telematics data captured during a during travel engine idle segment indicates that the vehicle's parking brake was engaged during the engine idle segment, the engine idle segment will not be associated with a travel delay. In further embodiments, the efficiency analysis module 600 may be configured to identify other data indicating non-travel related delays, such as a seat belt being disengaged during the engine idle segment.

By examining the telematics data captured during each identified engine idle segment, the efficiency analysis module 600 isolates those engine idle segments attributable to travel delays. The efficiency analysis module 600 is configured to then add the duration of each engine idle segment attributable to travel delays to calculate the total amount of engine idle time associated with travel delays for the analysis parameters. Finally, the efficiency analysis module 600 calculates the corrected engine idle time by subtracting the total amount of engine idle time associated with travel delays from the actual engine idle time determined in step 614.

Next, at step 618, the efficiency analysis module displays the calculated actual engine idle time and corrected engine idle time. According to the other embodiments, the efficiency analysis module 600 may be configured to display only one of these calculated values based on user preferences. For example, in the exemplary user interface shown in FIG. 10, the actual engine idle time is labeled as "Total Idle Time Mins" in the left column.

Next, at step 620, the efficiency analysis module 600 calculates the actual engine idle time percentage. In one embodiment, this is accomplished by determining from the telematics data the total engine running time for the analysis parameters and dividing the actual engine idle time calculated in step 614 by the total engine running time. The resulting actual engine idle time percentage represents the percentage of total engine running time the vehicle engine was idling.

Next, at step 622, the efficiency analysis module 600 calculates the corrected engine idle time percentage. In one embodiment, this is accomplished by dividing the corrected engine idle time calculated in step 616 by the total engine running time. The resulting corrected engine idle time percentage represents the percentage of total engine running time the vehicles' engine was idling due to non-travel delays.

Next, at step 624, the efficiency analysis module 600 displays the calculated actual engine idle time percentage and calculated corrected engine idle time percentage via a user interface. According to the other embodiments, the efficiency analysis module 600 may be configured to display only one of these calculated values based on user preferences. For example, FIG. 10 shows an exemplary user interface configured to display, among other things, engine idle segments that the central server 120 has associated with vehicle trip segments and the engine idle time percentage calculated from those engine idle segments. The actual engine idle time percentage is labeled as "Idle % of Total Engine Runtime." In addition, the exemplary user interface includes a table of engine idle segments. For each engine idle segment, the table displays the start time of the segment (the "Start" column), the vehicle trip segment in which the engine idle segment occurred (the "Idle Type" column), and the duration of the engine idle segment (the "Idle Time" column).

According to another embodiment (not shown), the efficiency analysis module 600 is further configured to generate an alert indicating to a user of the fleet management system 5 that a potential driver inefficiency has been detected. For example, in one embodiment, the central server 120 sends an email to the fleet management system user indicating that a potential driver inefficiency has been detected and describing the potential driver inefficiency. In a further embodiment, the email may display the particular telematics data indicating the driver inefficiency or provide a link to the data. In yet another embodiment, the central server 120 generates an alert via a user interface (e.g., the user interface shown in FIG. 10) indicating the identified engine idle segments.

According to further embodiments (not show), the efficiency analysis module 600 is configured to compare efficiency statistics (e.g., engine idle time percentage) for different analysis parameters. For example, in one embodiment, the travel analysis module 900 is configured to compare engine idle time percentage associated with different drivers on a particular date. In FIG. 10, the central server 120 has calculated efficiency statistics for each of the drivers listed in the top right box. By selecting a driver, "John Doe" in the Figure, a user can view statistics for that driver. According to other embodiments, the efficiency analysis module 900 is configured to display the results in a comparative format.

According to other embodiments, the efficiency analysis module 600 may be configured to execute all or a portion of the steps shown in FIG. 6 in the same or a different order. For example, in one embodiment, the efficiency analysis module does not execute step 608 and, instead, executes steps 610 and 612 automatically without providing a user with the option detected in step 608. In yet another embodiment, additional steps may be added to the efficiency analysis module 600 to make steps 614-624 optional steps executed in response to a user request.

Safety Analysis Module

According to various embodiments, the safety analysis module 700 is configured to analyze engine idle data in relation to other telematics data and in accordance with user preferences to (i) identify engine idle segments indicating potential safety hazards present in the operation of a delivery vehicle and (ii) identify specific safety hazards indicated by the engine idle segments and associated telematics data.

Figure 7:
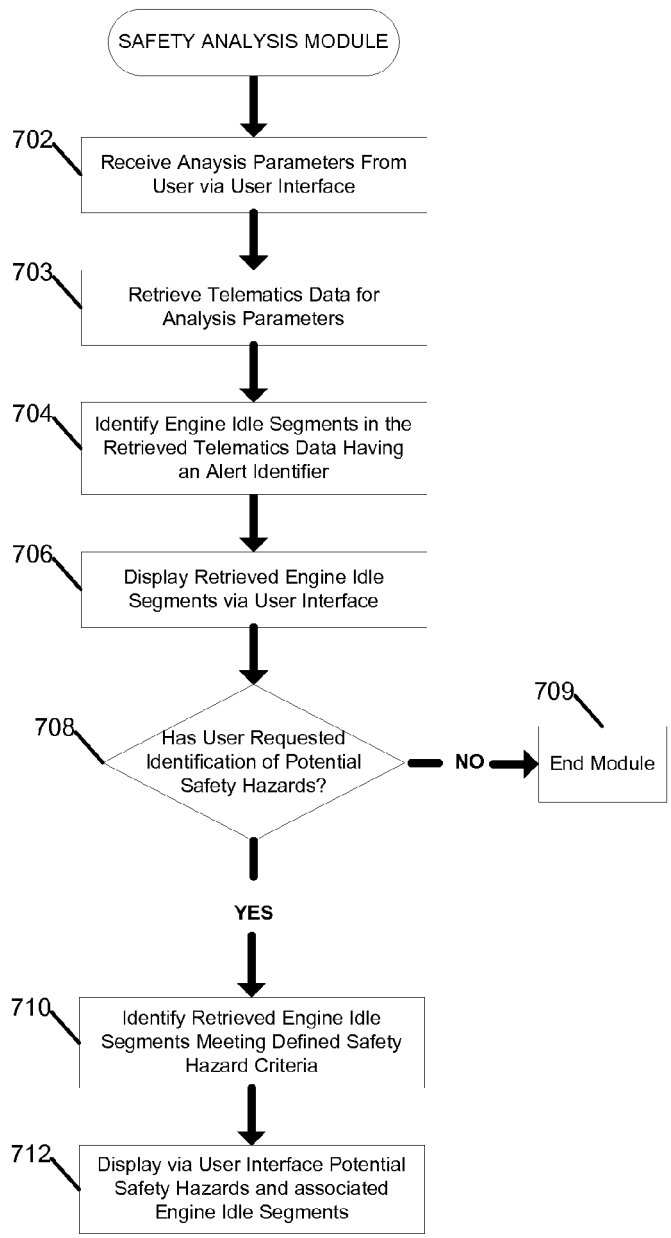
FIG. 7 is a flow diagram of steps executed by the safety analysis module shown in FIG. 3 according to a particular embodiment.

FIG. 7 illustrates exemplary steps executed by the safety analysis module 700 according to one embodiment. Beginning with step 702, the safety analysis module 700 receives user preferences for a safety analysis in the form of analysis parameters. These analysis parameters may be, for example, the same or similar to those described above in relation to the efficiency analysis module 600. According to one embodiment, the safety analysis module 700 provides the user with the option of using analysis parameters previously specified for an efficiency analysis, or inputting unique parameters for the safety analysis.

Next, at step 703, the safety analysis module 700 retrieves telematics data stored by the central server 120 meeting the analysis parameters received in step 702. This may be accomplished, for example, in the same or a similar manner to that described above in relation to step 603 of the efficiency analysis module 600.

Next, at step 704, the safety analysis module 700 identifies all engine idle segments present in the retrieved telematics data having an alert identifier assigned by the central server 120 (see FIG. 5, step 512). Next, at step 706, the safety analysis module 700 displays the identified engine idle segments via a user interface. According to various embodiments, the identified engine idle segments may be displayed in any of the ways described above in relation to step 606 of the efficiency analysis module 600.

Next, at step 708, the safety analysis module 700 determines whether the user has requested the central server 120 to identify potential safety hazards indicated by the identified engine idle segments and retrieved telematics data (e.g., by selecting this option with a computer mouse via a user interface). If the user has not made this request, the safety analysis module 700 moves to step 709 and ends. If the user has made this request, the safety analysis module 700 moves to step 710.

Next, at step 710, the safety analysis module 700 identifies the retrieved engine idle segments meeting one or more sets of defined safety criteria. According to one embodiment, the safety criteria are programmable criteria for identifying specific potential safety hazards in a delivery process. For example, a common safety hazard in a delivery process occurs when a driver starts a delivery vehicle before fastening his or her seat belt. To identify the occurrence of this safety hazard from the engine idle segments and telematics data, safety criteria may be defined and associated with this particular safety hazard.

For example, in one embodiment, safety criteria associated with the starting a vehicle before fastening the seat belt is defined as any engine idle segment occurring in the start of trip segment where the telematics data indicates a seat belt was secured during the engine idle segment. In this embodiment, to determine whether any engine idle segments meet this safety criteria, the safety analysis module 700 first identifies, from the set of previously identified engine idle segments meeting the analysis parameters, the engine idle segments occurring in the start of trip segment. For each of these start of trip engine idle segments, the safety analysis module 700 determines the duration of the engine idle segment and the time the engine idle segment began (or ended). Using the duration and start or end time as a guide, the safety analysis module 700 then searches the telematics data collected and stored during each engine idle segment for data indicating a seat belt was engaged. If the telematics data indicates a seat belt was engaged during a particular engine idle segment, the safety analysis module 700 determines that this particular safety hazard (i.e., starting the vehicle without first securing a seat belt) occurred for the vehicle, driver, and route associated with the particular engine idle segment.

According to various embodiments, the safety analysis module 700 may be configured to identify additional or different safety hazards based on defined safety criteria for each safety hazard. Exemplary safety hazards identifiable by the safety analysis module 700 include but are not limited to the driver: (1) driving a vehicle with the seatbelt unsecured; (2) starting or driving a vehicle with the bulkhead door (or other door) open; (3) allowing the vehicle to idle while the driver is outside of the cockpit (which may be detected by having a sensor sense the driver grasping a handle to exit the vehicle while the vehicle is idling); and (4) driving the vehicle while using a portable data acquisition device (e.g., a DIAD). Safety criteria may be defined and identified for these and other safety hazards by the safety analysis module 700 in a manner similar to that described above.

Next, at step 712, the safety analysis module 700 displays information via a user interface indicating the specific safety hazards determined to have occurred in step 710. In one embodiment, step 712 may also include displaying or providing a link to the specific telematics data indicating an identified safety hazard.

According to another embodiment (not shown), the safety analysis module 700 is further configured to generate an alert indicating to a user of the fleet management system 5 that a potential safety hazard has been detected. For example, in one embodiment, the central server 120 sends an email to the fleet management system user indicating that a potential safety hazard has been detected and describing the potential safety hazard. In a further embodiment, the email may display the particular telematics data indicating the safety hazard or provide a link to the data. In yet another embodiment, the central server 120 generates an alert via a user interface (e.g., the user interface shown in FIG. 10) indicating the identified engine idle segments.

Theft Analysis Module

According to various embodiments, the theft analysis module 800 is configured to analyze engine idle data in relation to other telematics data and in accordance with user preferences to (i) identify engine idle segments indicating potential theft hazards present in the operation of a delivery vehicle and (ii) identify specific theft hazards indicated by the engine idle segments and associated telematics data.

Figure 8:
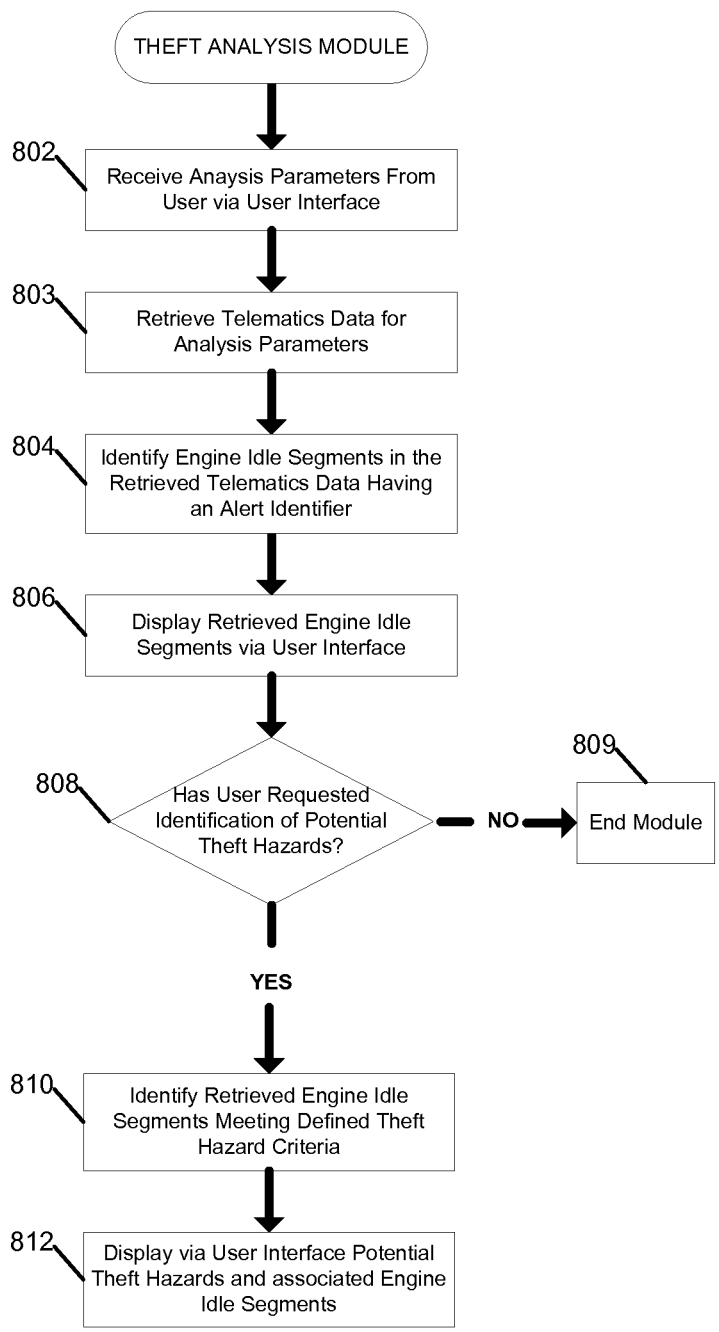
FIG. 8 is a flow diagram of steps executed by the theft analysis module shown in FIG. 3 according to a certain embodiment.

FIG. 8 illustrates exemplary steps executed by the theft analysis module 800 according to one embodiment. Beginning with step 802, the theft analysis module 800 receives user preferences for a theft analysis in the form of analysis parameters. These analysis parameters may be, for example, the same or similar to those described above in relation to the efficiency analysis module 600 and safety analysis module 700. According to one embodiment, the theft analysis module 800 provides the user with the option of using analysis parameters previously specified for an efficiency analysis or safety analysis, or inputting unique parameters for the theft analysis.

Next, at step 803, the theft analysis module 800 retrieves telematics data stored by the central server 120 meeting the analysis parameters received in step 802. This may be accomplished, for example, in the same or a similar manner to that described above in relation to step 603 of the efficiency analysis module 600.

Next, at step 804, the theft analysis module 800 identifies all engine idle segments present in the retrieved telematics data having an alert identifier assigned by the central server 120 (see FIG. 5, step 512). Next, at step 806, the theft analysis module 800 displays the identified engine idle segments via a user interface. According to various embodiments, the identified engine idle segments may be displayed in any of the ways described above in relation to step 606 of the efficiency analysis module 600.

Next, at step 808, the theft analysis module 800 determines whether the user has requested the central server 120 to identify potential theft hazards indicated by the identified engine idle segments and retrieved telematics data (e.g., by selecting this option with a computer mouse via a user interface). If the user has not made this request, the theft analysis module 800 moves to step 809 and ends. If the user has made this request, the theft analysis module 800 moves to step 810.

Next, at step 810, the theft analysis module 800 identifies the retrieved engine idle segments meeting one or more sets of defined theft criteria. According to one embodiment, the theft criteria are programmable criteria for identifying specific potential theft hazards in a delivery process. For example, a common theft hazard in a delivery process occurs when a driver leaves a door to the delivery vehicle open while the engine is idling. To identify the occurrence of this theft hazard from the engine idle segments and telematics data, theft criteria may be defined and associated with this particular theft hazard.

For example, in one embodiment, theft criteria associated with leaving a door to the delivery vehicle open while the engine is idling is defined as any engine idle segment where the telematics data indicates a vehicle door is open during the engine idle segment. In this embodiment, to determine whether any engine idle segments meet this theft criteria, the theft analysis module 800 first retrieves the set of previously identified engine idle segments associated with alert identifiers. For each of these engine idle segments, the theft analysis module 800 determines the duration of the engine idle segment and the time the engine idle segment began (or ended). Using the duration and start or end time as a guide, the theft analysis module 800 then searches the telematics data collected and stored during each engine idle segment for data indicating a door to the vehicle was open. If the telematics data indicates a door to the vehicle was open during a particular engine idle segment, the theft analysis module 800 determines that this particular theft hazard (i.e., leaving a vehicle door open while the engine is idling) occurred for the vehicle, driver, and route associated with the particular engine idle segment.

According to various embodiments, the theft analysis module 800 may be configured to identify additional or different theft hazards based on defined theft criteria for each theft hazard. Exemplary theft hazards identifiable by the theft analysis module 800 include but are not limited to: (1) allowing the vehicle to idle while outside of the cockpit (e.g., sensing the driver grasp a handle to exit the vehicle while the vehicle is idling); and (2) failing to secure or lock vehicle doors. Theft criteria may be defined and identified for these and other theft hazards by the theft analysis module 800 in a manner similar to that described above.

Next, at step 812, the theft analysis module 800 displays information via a user interface indicating the specific theft hazards determined to have occurred in step 810. In one embodiment, step 812 may also include displaying or providing a link to the specific telematics data indicating an identified theft hazard.

According to another embodiment (not shown), the theft analysis module 800 is further configured to generate an alert indicating to a user of the fleet management system 5 that a potential theft hazard has been detected. For example, in one embodiment, the central server 120 sends an email to the fleet management system user indicating that a potential theft hazard has been detected and describing the potential theft hazard. In a further embodiment, the email may display the particular telematics data indicating the theft hazard or provide a link to the data. In yet another embodiment, the central server 120 generates an alert via a user interface (e.g., the user interface shown in FIG. 10) indicating the identified engine idle segments.

Travel Analysis Module

According to various embodiments, the travel analysis module 900 is configured to provide a user with various options for analyzing travel aspects of the delivery vehicles 100 in the fleet management system 5. In one embodiment, the travel analysis module 900 is configured to analyze engine idle data in relation to other telematics data and in accordance with user preferences to (i) estimate the travel delay associated with particular analysis parameters and (ii) determine the actual vehicle speed and corrected vehicle speed for vehicles associated with particular analysis parameters.

Figure 9:
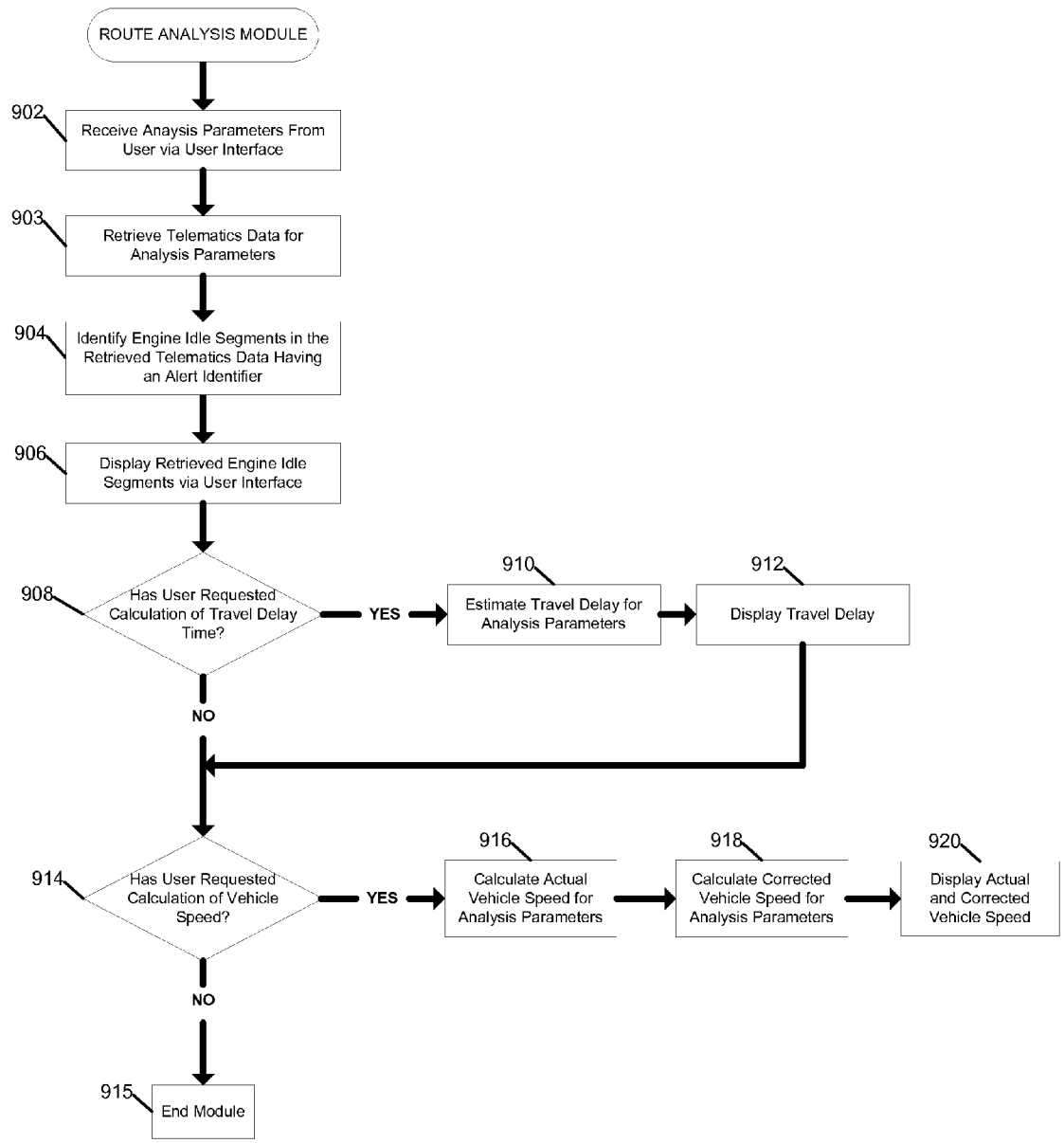
FIG. 9 is a flow diagram of steps executed by the travel analysis module shown in FIG. 3 according to one embodiment.

FIG. 9 illustrates exemplary steps executed by the travel analysis module 900 according to one embodiment. Beginning with step 902, the travel analysis module 900 receives user preferences for a travel analysis in the form of analysis parameters. These analysis parameters may be, for example, the same or similar to those described above in relation to the efficiency analysis module 600, safety analysis module 700, and theft analysis module 900. According to one embodiment, the travel analysis module 900 provides the user with the option of using analysis parameters previously specified for an efficiency analysis, safety analysis, or theft analysis, or inputting unique parameters for the travel analysis.

Next, at step 903, the travel analysis module 900 retrieves telematics data stored by the central server 120 meeting the analysis parameters received in step 902. This may be accomplished, for example, in the same or a similar manner to that described above in relation to step 603 of the efficiency analysis module 600.

Next, at step 904, the travel analysis module 900 identifies all engine idle segments present in the retrieved telematics data having an alert identifier assigned by the central server 120 (see FIG. 5, step 512). Next, at step 906, the travel analysis module 900 displays the identified engine idle segments via a user interface. According to various embodiments, the identified engine idle segments may be displayed in any of the ways described above in relation to step 606 of the efficiency analysis module 600.

Next, at step 908, the travel analysis module 900 determines whether the user has requested the central server 120 to estimate the travel delay time for vehicles and/or routes specified in the analysis parameters (e.g., by selecting this option with a computer mouse via a user interface). If the user has not made this request, the travel analysis module 900 moves to step 914. If the user has made this request, the travel analysis module 900 moves to step 910.

Next, at step 910, the travel analysis module 900 estimates the travel delay or delays associated with the specified analysis parameters. For example, if the user specifies a particular date and vehicle, the travel analysis module 900 will estimate the travel delay for the specified vehicle over the course of the specified date. If the user further specifies a particular route, the travel analysis module 900 will estimate the travel delay for the specified vehicle while traveling along the specified route on the specified date. As another example, if the user specifies only a date and route, the travel analysis module 900 will estimate the travel delay for each vehicle traveling along the specified route on the specified date.

According to one embodiment, the travel analysis module 900 is configured to estimate the travel delay for a particular vehicle by first identifying, from the engine idle segments identified in step 904, those engine idle segments caused by travel delays. This may be accomplished, for example, in the manner described above in relation to step 616 executed by the efficiency analysis module 600. Next, the travel analysis module 900 examines the telematics data captured during those engine idle segments and searches for data indicating non-travel related delays. This may also be accomplished, for example, in the manner described above in relation to step 616 executed by the efficiency analysis module 600.

By examining the telematics data captured during each identified engine idle segment, the travel analysis module 900 isolates those engine idle segments attributable to travel delays. The travel analysis module 900 is configured to then add the durations of each engine idle segment attributable to travel delays to calculate the total amount of engine idle time associated with travel delays for the analysis parameters. The engine idle time associated with travel delays serves as an estimate of the travel delay.

Next, at step 912, the travel analysis module 900 displays via a user interface the travel delay estimated in step 810. In one embodiment, step 912 may also include displaying or providing a link to the specific telematics data used to estimate the travel delay.

Next, at step 914, the travel analysis module 900 determines whether the user has requested the central server 120 to calculate vehicle speeds for vehicles specified in the analysis parameters (e.g., by selecting this option with a computer mouse via a user interface). If the user has not made this request, the travel analysis module 900 moves to step 915 and ends. If the user has made this request, the travel analysis module 900 moves to step 916.

Next, at step 916, the travel analysis module 900 calculates the actual vehicle speed for vehicles specified in the analysis parameters. As described above, the relevant vehicles may be defined by the analysis parameters in terms of specific vehicles, or vehicles associated with a specified route or routes. In addition, actual speed for the relevant vehicles will be calculated for the analysis parameters. For example, if the user specifies in the analysis parameters a particular vehicle, date, and route, the travel analysis module 900 will calculate the average actual speed of the specified vehicle while traveling on the specified route on the specified day. As another example, if the user specifies in the analysis parameters a particular vehicle, date, and two geographic points, the travel analysis module 900 will calculate the average actual speed of the specified vehicle while traveling between the two specified geographic points on the specified date. As yet another example, if the user specifies in the analysis parameters a particular route and a particular time period (e.g., 7:00 am to 9:00 am), the travel analysis module 900 will calculate the average actual speed of each vehicle traveling along the specified route during the specified time period on the specified date.

In various embodiments, the travel analysis module 900 is configured to calculate the actual vehicle speed for each relevant vehicle(s) by first determining, from the telematics data retrieved in step 903, the distance traveled by the relevant vehicle(s) according to the analysis parameters and the travel time for that that distance. Next, by dividing the distance traveled by the travel time, the travel analysis module 900 calculates the actual vehicle speed for the analysis parameters.

Next, at step 918, the travel analysis module 900 calculates the corrected vehicle speed for the relevant vehicles according to the analysis parameters. In one embodiment, the travel analysis module 900 is configured to calculate the corrected vehicle speed by first determining the travel delay time associated with the analysis parameters. This may be accomplished, for example, as described above in step 910. Next, the travel analysis module 900 subtracts the travel delay time from the travel time determined in step 916, resulting in a corrected travel time representing the actual travel time less time attributed to travel delays. Finally, by the distance traveled (calculated in step 916) by the corrected travel time, the travel analysis module 900 calculates the corrected vehicle speed for the analysis parameters.

According to further embodiments (not show), the travel analysis module 900 is configured to compare travel delay and vehicle speed figures calculated for different analysis parameters. For example, in one embodiment, the travel analysis module 900 is configured to compare travel delays associated with two different routes on a particular date. In this embodiment, the travel analysis module 900 is configured to calculate the travel delays for vehicles traveling on each route and display the results in a comparative format.

Similarly, in other embodiments, the travel analysis module 900 is configured to compare vehicle speeds for various analysis parameters.

CONCLUSION

As should be appreciated, the embodiments may be implemented in various ways, including as methods, apparatus, systems, or computer program products. Accordingly, the embodiments may take the form of an entirely hardware embodiment or an embodiment in which a processor is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

The embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for assessing vehicle efficiency, the method comprising:
   receiving, via one or more processors, telematics data for a vehicle, the telematics data comprising engine idle data relating to the engine idle time of the vehicle;
   associating, via the one or more processors, the telematics data with a particular segment of a vehicle trip; and
   executing, via the one or more processors, a step selected from the group consisting of:
      determining, via the one or more processors, whether the telematics data indicates a potential inefficient operation of the vehicle and, in response to determining that the telematics data indicates a potential inefficient operation of the vehicle, generating an alert indicating the potential inefficient operation;
      determining, via the one or more processors, whether the telematics data indicates a potential safety hazard and, in response to determining that the telematics data indicates a potential safety hazard, generating an alert indicating the potential safety hazard; and
      determining, via the one or more processors, whether the telematics data indicates a potential theft hazard and, in response to determining that the telematics data indicates a potential theft hazard, generating an alert indicating the potential theft hazard.

2. The method of claim 1, wherein the step of associating the telematics data with a particular segment of a vehicle trip comprises steps for associating, via the one or more processors, the telematics data with a particular segment selected from the group consisting of:
   a start of trip segment;
   a during travel segment; and
   an end of trip segment.

3. The method of claim 1, wherein:
   the telematics data further comprises seat belt data indicating the status of a seat belt in the vehicle; and
   determining whether the telematics data indicates a potential inefficient operation of the vehicle comprises determining, via the one or more processors and based on the telematics data, whether a driver of the vehicle fastened or unfastened a driver's side seat belt of the vehicle while the vehicle's engine was idling.

4. The method of claim 1, wherein:
   the telematics data further comprises door data indicating the status of a door of the vehicle; and
   determining whether the telematics data indicates a potential inefficient operation of the vehicle comprises determining, via the one or more processors and based on the telematics data, whether the door was opened or closed while the vehicle was idling.

5. The method of claim 1, wherein:
   the telematics data further comprises door data indicating the status of a door of the vehicle; and
   determining whether the telematics data indicates a potential theft hazard comprises determining, via the one or more processors and based on the telematics data, whether the door was opened or closed while the vehicle was idling.

6. The method of claim 1, wherein:
   the engine idle data comprises data indicating engine idle events that define engine idle segments; and
   determining whether the telematics data indicates a potential inefficient operation of the vehicle comprises identifying, via the one or more processors and based on the telematics data, engine idle segments caused by travel delays.

7. The method of claim 6, wherein:
determining whether the telematics data indicates a potential inefficient operation of the vehicle comprises:
determining, based on the identified engine idle segments caused by travel delays, an amount of engine idle time caused by travel delays for the vehicle for a particular portion of the vehicle trip; and
determining, based on the telematics data and the amount of engine idle time caused by travel delays, the corrected speed of the vehicle for the particular portion of the vehicle trip.

8. The method of claim 6, wherein:
determining whether the telematics data indicates a potential inefficient operation of the vehicle comprises:
determining, based on the telematics data, a total amount of engine running time for the vehicle during a particular portion of the vehicle trip;
determining, based on the engine idle segments caused by travel delays, an amount of engine idle time caused by travel delays for the vehicle during the particular portion of the vehicle trip; and
determining, based on the total amount of engine running time and the engine idle time caused by travel delays, a corrected engine idle time percentage for the vehicle during the particular portion of the vehicle trip, wherein the corrected engine idle time percentage is the percentage of engine running time during the portion of the vehicle trip that the vehicle's engine was idling exclusive of engine idle time caused by travel delays.

9. A computer program product comprising at least one non-transitory computer-readable storage medium having computer-readable program code portions stored therein, the computer-readable program code portions comprising:
an executable portion configured to receive telematics data for a vehicle, the telematics data comprising engine idle data relating to the engine idle time of the vehicle;
an executable portion configured to associate the telematics data with a particular segment of a vehicle trip; and
an executable portion selected from the group consisting of:
an executable portion configured to determine whether the telematics data indicates a potential inefficient operation of the vehicle and, in response to determining that the telematics data indicates a potential inefficient operation of the vehicle, generating an alert indicating the potential inefficient operation;
an executable portion configured to determine whether the telematics data indicates a potential safety hazard and, in response to determining that the telematics data indicates a potential safety hazard, generating an alert indicating the potential safety hazard; and
an executable portion configured to determine whether the telematics data indicates a potential theft hazard and, in response to determining that the telematics data indicates a potential theft hazard, generating an alert indicating the potential theft hazard.

10. The computer program product of claim 9, wherein the executable portion configured to associate the telematics data with a particular segment of a vehicle trip comprises an executable portion configured to associate the telematics data with a particular segment selected from the group consisting of:
a start of trip segment;
a during travel segment; and
an end of trip segment.

11. The computer program product of claim 9, wherein:
the telematics data further comprises seat belt data indicating the status of a seat belt in the vehicle; and
the executable portion configured to determine whether the telematics data indicates a potential inefficient operation of the vehicle comprises an executable portion configured to determine, based on the telematics data, whether a driver of the vehicle fastened or unfastened a driver's side seat belt of the vehicle while the vehicle's engine was idling.

12. The computer program product of claim 9, wherein:
the telematics data further comprises door data indicating the status of a door in the vehicle; and
the executable portion configured to determine whether the telematics data indicates a potential inefficient operation of the vehicle comprises an executable portion configured to determine, based on the telematics data, whether the door was opened or closed while the vehicle was idling.

13. The computer program product of claim 9, wherein:
the telematics data further comprises door data indicating the status of a door in the vehicle; and
the executable portion configured to determine whether the telematics data indicates a potential theft hazard comprises an executable portion configured to determine, based on the telematics data, whether the door was opened or closed while the vehicle was idling.

14. The computer program product of claim 9, wherein:
the engine idle data comprises data indicating engine idle events that define engine idle segments; and
the executable portion configured to determine whether the telematics data indicates a potential inefficient operation of the vehicle comprises an executable portion configured to identify, based on the telematics data, engine idle segments caused by travel delays.

15. The computer program product of claim 14, wherein:
the executable portion configured to determine whether the telematics data indicates a potential inefficient operation of the vehicle comprises:
an executable portion configured to determine, based on the identified engine idle segments caused by travel delays, an amount of engine idle time caused by travel delays for the vehicle for a particular portion of the vehicle trip; and
an executable portion configured to determine, based on the telematics data and the amount of engine idle time caused by travel delays, the corrected speed of the vehicle for the particular portion of the vehicle trip.

16. The computer program product of claim 14, wherein:
the executable portion configured to determine whether the telematics data indicates a potential inefficient operation of the vehicle comprises:
an executable portion configured to determine, based on the telematics data, a total amount of engine running time for the vehicle during a particular portion of the vehicle trip;
an executable portion configured to determine, based on the engine idle segments caused by travel delays, an amount of engine idle time caused by travel delays for the vehicle during the particular portion of the vehicle trip; and
an executable portion configured to determine, based on the total amount of engine running time and the engine idle time caused by travel delays, a corrected engine idle time percentage for the vehicle during the particular portion of the vehicle trip, wherein the corrected engine idle time percentage is the percentage of engine running time during the portion of the vehicle trip that the vehicle's engine was idling exclusive of engine idle time caused by travel delays.

17. A fleet management computer system comprising one or more memory storage areas and one or more processors, the system configured to:
   receive telematics data from one or more vehicle sensors associated with a vehicle, the telematics data comprising engine idle data relating to the engine idle time of the vehicle;
   associate the telematics data with a particular segment of a vehicle trip; and
   execute a step selected from a group consisting of:
      determining whether the telematics data indicates a potential inefficient operation of the vehicle and, in response to determining that the telematics data indicates a potential inefficient operation of the vehicle, generating an alert indicating the potential inefficient operation;
      determining whether the telematics data indicates a potential safety hazard and, in response to determining that the telematics data indicates a potential safety hazard, generating an alert indicating the potential safety hazard; and
      determining whether the telematics data indicates a potential theft hazard and, in response to determining that the telematics data indicates a potential theft hazard, generating an alert indicating the potential theft hazard.

18. The fleet management computer system of claim 17, wherein the particular segment is selected from a group consisting of:
   a start of trip segment;
   a during travel segment; and
   an end of trip segment.

19. The fleet management computer system of claim 17, wherein:
   the telematics data further comprises seat belt data indicating the status of a seat belt in the vehicle; and
   the step of determining whether the telematics data indicates a potential inefficient operation of the vehicle comprises determining, based on the telematics data, whether a driver of the vehicle fastened or unfastened a driver's side seat belt of the vehicle while the vehicle's engine was idling.

20. The fleet management computer system of claim 17, wherein:
   the telematics data further comprises door data indicating the status of a door of the vehicle; and
   the step of determining whether the telematics data indicates a potential inefficient operation of the vehicle comprises determining, based on the telematics data, whether the door was opened or closed while the vehicle was idling.

21. The fleet management computer system of claim 17, wherein:
   the telematics data further comprises door data indicating the status of a door of the vehicle; and
   the step of determining whether the telematics data indicates a potential theft hazard comprises determining, based on the telematics data, whether the door was opened or closed while the vehicle was idling.

22. The fleet management computer system of claim 17, wherein:
   the engine idle data comprises data indicating engine idle events that define engine idle segments; and
   the step of determining whether the telematics data indicates a potential inefficient operation of the vehicle comprises identifying, based on the telematics data, engine idle segments caused by travel delays.

23. The fleet management computer system of claim 22, wherein:
   the step of determining whether the telematics data indicates a potential inefficient operation of the vehicle further comprises:
      determining, based on the identified engine idle segments caused by travel delays, an amount of engine idle time caused by travel delays for the vehicle for a particular portion of the vehicle trip; and
      determining, based on the telematics data and the amount of engine idle time caused by travel delays, the corrected speed of the vehicle for the particular portion of the vehicle trip.

24. The fleet management computer system of claim 22, wherein:
   the step of determining whether the telematics data indicates a potential inefficient operation of the vehicle further comprises:
      determining, based on the telematics data, a total amount of engine running time for the vehicle during a particular portion of the vehicle trip;
      determining, based on the engine idle segments caused by travel delays, an amount of engine idle time caused by travel delays for the vehicle during the particular portion of the vehicle trip; and
      determining, based on the total amount of engine running time and the engine idle time caused by travel delays, a corrected engine idle time percentage for the vehicle during the particular portion of the vehicle trip, wherein the corrected engine idle time percentage is the percentage of engine running time during the portion of the vehicle trip that the vehicle's engine was idling exclusive of engine idle time caused by travel delays.

* * * * *